United States Patent
Broaddus et al.

(10) Patent No.: US 12,518,537 B1
(45) Date of Patent: Jan. 6, 2026

(54) DETECTING SHOPPING EVENTS BASED ON CONTENTS OF HANDS DEPICTED WITHIN IMAGES

(71) Applicant: Amazon Technologies, Inc., Seattle, WA (US)

(72) Inventors: Chris Broaddus, Sammamish, WA (US); Jose Ariel Keselman, Kyriat Tivon (IL); Amir Nahir, Megadim (IL); Leonid Pishchulin, Seattle, WA (US); Roee Peleg, Haifa (IL); Petko Tsonev, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 517 days.

(21) Appl. No.: 17/952,156

(22) Filed: Sep. 23, 2022

(51) Int. Cl.
*G06V 20/52* (2022.01)
*G06Q 10/087* (2023.01)
(Continued)

(52) U.S. Cl.
CPC ........... *G06V 20/52* (2022.01); *G06Q 10/087* (2013.01); *G06T 7/11* (2017.01); *G06T 7/70* (2017.01);
(Continued)

(58) Field of Classification Search
None
See application file for complete search history.

(56) References Cited

U.S. PATENT DOCUMENTS 6,154,559 A 11/2000 Beardsley
7,050,624 B2 5/2006 Dialameh et al.
(Continued)

FOREIGN PATENT DOCUMENTS

CN 104778690 B 6/2017
CN 111626681 A * 9/2020 ........... G06Q 10/087
(Continued)

OTHER PUBLICATIONS

Black, J. et al., "Multi View Image Surveillance and Tracking," IEEE Proceedings of the Workshop on Motion and Video Computing, 2002, https://www.researchgate.net/publication/4004539_Multi_view_image_surveillance_and_tracking/link/0c96051ac521f09b5b000000/download, pp. 1-6.

Ciplak G, Telceken S., "Moving Object Tracking Within Surveillance Video Sequences Based on EDContours," 2015 9th International Conference on Electrical and Electronics Engineering (ELECO), Nov. 26, 2015 (pp. 720-723). IEEE.
(Continued)

*Primary Examiner* — John Villecco
*Assistant Examiner* — Joshua B. Crockett
(74) *Attorney, Agent, or Firm* — Athorus, PLLC

(57) ABSTRACT

Images captured by cameras at a store or another facility are cropped to include portions of such images depicting hands. When an event of a type is determined to have occurred at a time and at a location within the facility, the cropped images are filtered based on the type, the location, and the time of the event to include only images that might depict one item within a hand of an actor. The cropped images, as filtered, are then processed to identify the item within the hand, such as by determining embeddings or other representations of the cropped images, and comparing such embeddings or other representations to embeddings or other representations of reference images of items that are available within the facility. Based on such comparisons, an item is identified as having been taken from the facility by the customer or deposited at the facility by the customer.

19 Claims, 17 Drawing Sheets

(51) Int. Cl.

| | |
|---|---|
| *G06T 7/11* | (2017.01) |
| *G06T 7/70* | (2017.01) |
| *G06V 10/74* | (2022.01) |
| *G06V 10/764* | (2022.01) |
| *G06V 20/40* | (2022.01) |
| *G06V 40/10* | (2022.01) |
| *G06V 40/20* | (2022.01) |

(52) U.S. Cl.
CPC .......... *G06V 10/761* (2022.01); *G06V 10/764* (2022.01); *G06V 20/44* (2022.01); *G06V 40/103* (2022.01); *G06V 40/11* (2022.01); *G06V 40/28* (2022.01); *G06T 2207/20132* (2013.01); *G06T 2207/30196* (2013.01); *G06T 2207/30242* (2013.01); *G06V 2201/07* (2022.01)

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |
| 8,009,863 B1 | 8/2011 | Sharma et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,285,060 B2 | 10/2012 | Cobb et al. |
| 8,369,622 B1 | 2/2013 | Hsu et al. |
| 8,423,431 B1 | 4/2013 | Rouaix et al. |
| RE44,225 E | 5/2013 | Aviv |
| 8,577,705 B1 | 11/2013 | Baboo et al. |
| 8,630,924 B2 | 1/2014 | Groenevelt et al. |
| 8,688,598 B1 | 4/2014 | Shakes et al. |
| 8,943,441 B1 | 1/2015 | Patrick et al. |
| 9,158,974 B1 | 10/2015 | Laska et al. |
| 9,160,979 B1 | 10/2015 | Ulmer |
| 9,208,675 B2 | 12/2015 | Xu et al. |
| 9,336,456 B2 | 5/2016 | Delean |
| 9,449,233 B2 | 9/2016 | Taylor |
| 9,473,747 B2 | 10/2016 | Kobres et al. |
| 9,536,177 B2 | 1/2017 | Chalasani et al. |
| 9,582,891 B2 | 2/2017 | Geiger et al. |
| 9,727,838 B2 | 8/2017 | Campbell |
| 9,846,840 B1 | 12/2017 | Lin et al. |
| 9,881,221 B2 | 1/2018 | Bala et al. |
| 9,898,677 B1 | 2/2018 | Andjelković et al. |
| 9,911,290 B1 | 3/2018 | Zalewski et al. |
| 10,055,853 B1 | 8/2018 | Fisher et al. |
| 10,133,933 B1 * | 11/2018 | Fisher .................... G06V 20/41 |
| 10,147,210 B1 | 12/2018 | Desai et al. |
| 10,192,415 B2 | 1/2019 | Heitz et al. |
| 10,318,917 B1 | 6/2019 | Goldstein et al. |
| 10,354,262 B1 | 7/2019 | Hershey et al. |
| 10,438,164 B1 * | 10/2019 | Xiong .................... G06F 18/25 |
| 10,474,992 B2 | 11/2019 | Fisher et al. |
| 10,510,219 B1 | 12/2019 | Zalewski et al. |
| 10,535,146 B1 | 1/2020 | Buibas et al. |
| 10,635,844 B1 | 4/2020 | Roose et al. |
| 10,699,421 B1 | 6/2020 | Cherevatsky et al. |
| 10,839,203 B1 | 11/2020 | Guigues et al. |
| 11,030,442 B1 | 6/2021 | Bergamo et al. |
| 11,087,273 B1 * | 8/2021 | Bergamo ............... G06V 10/82 |
| 11,195,146 B2 | 12/2021 | Fisher et al. |
| 11,232,294 B1 | 1/2022 | Banerjee et al. |
| 11,270,260 B2 | 3/2022 | Fisher et al. |
| 11,284,041 B1 | 3/2022 | Bergamo et al. |
| 11,367,083 B1 | 6/2022 | Saurabh et al. |
| 11,468,698 B1 | 10/2022 | Kim et al. |
| 11,482,045 B1 | 10/2022 | Kim et al. |
| 11,538,186 B2 | 12/2022 | Fisher et al. |
| 11,734,949 B1 | 8/2023 | Kviatkovsky et al. |
| 12,283,201 B2 * | 4/2025 | Adato .................... G01G 19/52 |
| 2003/0002712 A1 | 1/2003 | Steenburgh et al. |
| 2003/0002717 A1 | 1/2003 | Hamid |
| 2003/0107649 A1 | 6/2003 | Flickner et al. |
| 2003/0128337 A1 | 7/2003 | Jaynes et al. |
| 2004/0181467 A1 | 9/2004 | Raiyani et al. |
| 2005/0251347 A1 | 11/2005 | Perona et al. |
| 2006/0018516 A1 | 1/2006 | Masoud et al. |
| 2006/0061583 A1 | 3/2006 | Spooner et al. |
| 2006/0222206 A1 | 10/2006 | Garoutte |
| 2007/0092133 A1 | 4/2007 | Luo |
| 2007/0156625 A1 | 7/2007 | Visel |
| 2007/0182818 A1 | 8/2007 | Buehler |
| 2007/0242066 A1 | 10/2007 | Rosenthal |
| 2007/0276776 A1 | 11/2007 | Sagher et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2008/0137989 A1 | 6/2008 | Ng et al. |
| 2008/0159634 A1 | 7/2008 | Sharma et al. |
| 2008/0166019 A1 | 7/2008 | Lee |
| 2008/0193010 A1 | 8/2008 | Eaton et al. |
| 2008/0195315 A1 | 8/2008 | Hu et al. |
| 2009/0060352 A1 | 3/2009 | Distante et al. |
| 2009/0083815 A1 | 3/2009 | McMaster et al. |
| 2009/0121017 A1 | 5/2009 | Cato et al. |
| 2009/0132371 A1 | 5/2009 | Strietzel et al. |
| 2009/0210367 A1 | 8/2009 | Armstrong et al. |
| 2009/0245573 A1 | 10/2009 | Saptharishi et al. |
| 2009/0276705 A1 | 11/2009 | Ozdemir et al. |
| 2010/0002082 A1 | 1/2010 | Buehler et al. |
| 2010/0033574 A1 | 2/2010 | Ran et al. |
| 2011/0011936 A1 | 1/2011 | Morandi et al. |
| 2011/0205022 A1 | 8/2011 | Cavallaro et al. |
| 2012/0106800 A1 | 5/2012 | Khan et al. |
| 2012/0148103 A1 | 6/2012 | Hampel et al. |
| 2012/0159290 A1 | 6/2012 | Pulsipher et al. |
| 2012/0257789 A1 | 10/2012 | Lee et al. |
| 2012/0284132 A1 | 11/2012 | Kim et al. |
| 2012/0327220 A1 | 12/2012 | Ma |
| 2013/0076898 A1 | 3/2013 | Philippe et al. |
| 2013/0095961 A1 | 4/2013 | Marty et al. |
| 2013/0156260 A1 | 6/2013 | Craig |
| 2013/0253700 A1 | 9/2013 | Carson et al. |
| 2013/0322767 A1 | 12/2013 | Chao et al. |
| 2014/0139633 A1 | 5/2014 | Wang et al. |
| 2014/0139655 A1 | 5/2014 | Mimar |
| 2014/0259056 A1 | 9/2014 | Grusd |
| 2014/0279294 A1 | 9/2014 | Field-Darragh et al. |
| 2014/0282162 A1 | 9/2014 | Fein et al. |
| 2014/0334675 A1 | 11/2014 | Chu et al. |
| 2014/0362195 A1 | 12/2014 | Ng-Thow-Hing et al. |
| 2014/0362223 A1 | 12/2014 | LaCroix et al. |
| 2014/0379296 A1 | 12/2014 | Nathan et al. |
| 2015/0019391 A1 | 1/2015 | Kumar et al. |
| 2015/0039458 A1 | 2/2015 | Reid |
| 2015/0073907 A1 | 3/2015 | Purves et al. |
| 2015/0131851 A1 | 5/2015 | Bernal et al. |
| 2015/0199824 A1 | 7/2015 | Kim et al. |
| 2015/0206188 A1 | 7/2015 | Tanigawa et al. |
| 2015/0262116 A1 | 9/2015 | Katircioglu et al. |
| 2015/0269143 A1 | 9/2015 | Park et al. |
| 2015/0294483 A1 | 10/2015 | Wells et al. |
| 2016/0003636 A1 | 1/2016 | Ng-Thow-Hing et al. |
| 2016/0012465 A1 | 1/2016 | Sharp |
| 2016/0059412 A1 | 3/2016 | Oleynik |
| 2016/0125245 A1 | 5/2016 | Saitwal et al. |
| 2016/0127641 A1 | 5/2016 | Gove |
| 2016/0292881 A1 | 10/2016 | Bose et al. |
| 2016/0307335 A1 | 10/2016 | Perry et al. |
| 2017/0116473 A1 | 4/2017 | Sashida et al. |
| 2017/0206669 A1 | 7/2017 | Saleemi et al. |
| 2017/0262994 A1 | 9/2017 | Kudriashov et al. |
| 2017/0278255 A1 | 9/2017 | Shingu et al. |
| 2017/0309136 A1 | 10/2017 | Schoner |
| 2017/0323376 A1 | 11/2017 | Glaser et al. |
| 2017/0345165 A1 | 11/2017 | Stanhill et al. |
| 2017/0352234 A1 | 12/2017 | Awaysheh et al. |
| 2017/0353661 A1 | 12/2017 | Kawamura |
| 2018/0025175 A1 | 1/2018 | Kato |
| 2018/0070056 A1 | 3/2018 | DeAngelis et al. |
| 2018/0084242 A1 | 3/2018 | Rublee et al. |

(56) References Cited

U.S. PATENT DOCUMENTS

| | | | |
|---|---|---|---|
| 2018/0164103 A1 | 6/2018 | Hill | |
| 2018/0165728 A1 | 6/2018 | McDonald et al. | |
| 2018/0218515 A1 | 8/2018 | Terekhov et al. | |
| 2018/0315329 A1 | 11/2018 | D'Amato et al. | |
| 2018/0343442 A1 | 11/2018 | Yoshikawa et al. | |
| 2019/0043003 A1 | 2/2019 | Fisher et al. | |
| 2019/0073627 A1 | 3/2019 | Nakdimon et al. | |
| 2019/0102044 A1 | 4/2019 | Wang et al. | |
| 2019/0156273 A1* | 5/2019 | Fisher | G06N 3/04 |
| 2019/0156274 A1 | 5/2019 | Fisher et al. | |
| 2019/0156277 A1 | 5/2019 | Fisher et al. | |
| 2019/0158801 A1 | 5/2019 | Matsubayashi | |
| 2019/0236531 A1 | 8/2019 | Adato et al. | |
| 2019/0315329 A1 | 10/2019 | Adamski et al. | |
| 2020/0005490 A1 | 1/2020 | Paik et al. | |
| 2020/0043086 A1 | 2/2020 | Sorensen | |
| 2020/0090484 A1 | 3/2020 | Chen et al. | |
| 2020/0134701 A1 | 4/2020 | Zucker et al. | |
| 2020/0279382 A1* | 9/2020 | Zhang | G06V 40/28 |
| 2020/0320287 A1 | 10/2020 | Porikli et al. | |
| 2020/0381111 A1 | 12/2020 | Huang et al. | |
| 2021/0019914 A1 | 1/2021 | Lipchin et al. | |
| 2021/0027485 A1 | 1/2021 | Zhang | |
| 2021/0124936 A1 | 4/2021 | Mirza et al. | |
| 2021/0182922 A1 | 6/2021 | Zheng et al. | |
| 2021/0287013 A1 | 9/2021 | Carter et al. | |
| 2021/0350555 A1* | 11/2021 | Fischetti | G06T 7/73 |
| 2021/0398097 A1* | 12/2021 | Wu | G06Q 20/208 |
| 2022/0028230 A1 | 1/2022 | Srinivasan et al. | |
| 2022/0101007 A1 | 3/2022 | Kadav et al. | |
| 2023/0298351 A1* | 9/2023 | Lee | F25D 29/00 |
| | | | 382/103 |

FOREIGN PATENT DOCUMENTS

| | | |
|---|---|---|
| EP | 1574986 B1 | 7/2008 |
| JP | 2013196199 A | 9/2013 |
| JP | 201489626 A | 5/2014 |
| JP | 2018207336 A | 12/2018 |
| JP | 2019018743 A | 2/2019 |
| JP | 2019096996 A | 6/2019 |
| KR | 20170006097 A | 1/2017 |
| WO | 0021021 A1 | 4/2000 |
| WO | 02059836 A2 | 8/2002 |
| WO | 2017151241 A2 | 9/2017 |

OTHER PUBLICATIONS

Fuentes et al., "People tracking in surveillance applications," Proceedings 2nd IEEE Int. Workshop on PETS, Kauai, Hawaii, USA, Dec. 9, 2001, 6 pages.
Grinciunaite, A., et al., "Human Pose Estimation in Space and Time Using 3D CNN," ECCV Workshop on Brave New Ideas for Motion Representations in Videos, Oct. 19, 2016, URL: https://arxiv.org/pdf/1609.00036.pdf, 7 pages.
Harville, M., "Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-view_templates_of_height_and_occupancy_statistics/link/5e294888a6fdcc70a1437262/download, pp. 127-142.
He, K., et al., "Identity Mappings in Deep Residual Networks," ECCV 2016 Camera-Ready, URL: https://arxiv.org/pdf/1603.05027.pdf, Jul. 25, 2016, 15 pages.
Huang, K. S. et al. "Driver's View and Vehicle Surround Estimation Using Omnidirectional Video Stream," IEEE IV2003 Intelligent Vehicles Symposium. Proceedings (Cal. No.03TH8683), Jun. 9-11, 2003, http://cvrr.ucsd.edu/VOW2/papers/IV03DrView_Final_Header.pdf, pp. 444-449.
Lee, K. and Kacorri, H., (May 2019), "Hands Holding Clues for Object Recognition in Teachable Machines", In Proceedings of the 2019 CHI Conference on Human Factors in Computing Systems (pp. 1-12).
Liu, C., et al. "Accelerating Vanishing Point-Based Line Sampling Scheme for Real-Time People Localization", IEEE Transactions on Circuits and Systems for Video Technology. vol 27. No. Mar. 3, 2017 (Year: 2017).
Longuet-Higgins, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.
Manocha et al., "Object Tracking Techniques for Video Tracking: A Survey," The International Journal of Engineering and Science (IJES), vol. 3, Issue 6, pp. 25-29, 2014.
Phalke K, Hegadi R., "Pixel Based Object Tracking," 2015 2nd International Conference on Signal Processing and Integrated Networks (SPIN), Feb. 19, 2015 (pp. 575-578). IEEE.
Redmon, J., et al., "You Only Look Once: Unified, Real-Time Object Detection," University of Washington, Allen Institute for AI, Facebook AI Research, URL: https://arxiv.org/pdf/1506.02640.pdf, May 9, 2016, 10 pages.
Redmon, Joseph and Ali Farhadi, "YOLO9000: Better, Faster, Stronger," URL: https://arxiv.org/pdf/1612.08242.pdf, Dec. 25, 2016, 9 pages.
Rossi, M. and Bozzoli, E. A., "Tracking and Counting Moving People," IEEE Int'l Conf. on Image Processing, ICIP-94, Nov. 13-16, 1994, http://citeseerx.ist.psu.edu/viewdoc/download;jsessionid=463D09F419FA5595DBF9DEF30D7EC663?doi=10.1.1.331.6672&rep=rep1&type=pdf, 5 pages.
Sikdar A, Zheng YF, Xuan D., "Robust Object Tracking in the X-Z Domain," 2016 IEEE International Conference on Multisensor Fusion and Integration for Intelligent Systems (MFI), Sep. 19, 2016 (pp. 499-504). IEEE.
Toshev, Alexander and Christian Szegedy, "DeepPose: Human Pose Estimation via Deep Neural Networks," IEEE Conference on Computer Vision and Pattern Recognition, Aug. 20, 2014, URL: https://arxiv.org/pdf/1312.4659.pdf, 9 pages.
Vincze, M., "Robust Tracking of Ellipses at Frame Rate," Pattern Recognition, vol. 34, Issue 2, Feb. 2001, pp. 487-498.
Zhang, Z., "A Flexible New Technique for Camera Calibration," IEEE Transactions on Pattern Analysis and Machine Intelligence, vol. 22, No. 11, Nov. 2000, 5 pages.
Zhang, Z., "A Flexible New Technique for Camera Calibration," Technical Report MSR-TR-98-71, Dec. 2, 1998, Microsoft Research, Microsoft Corporation, URL: https://www.microsoft.com/en-us/research/wp-content/uploads/2016/02/tr98-71.pdf, 22 pages.
Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

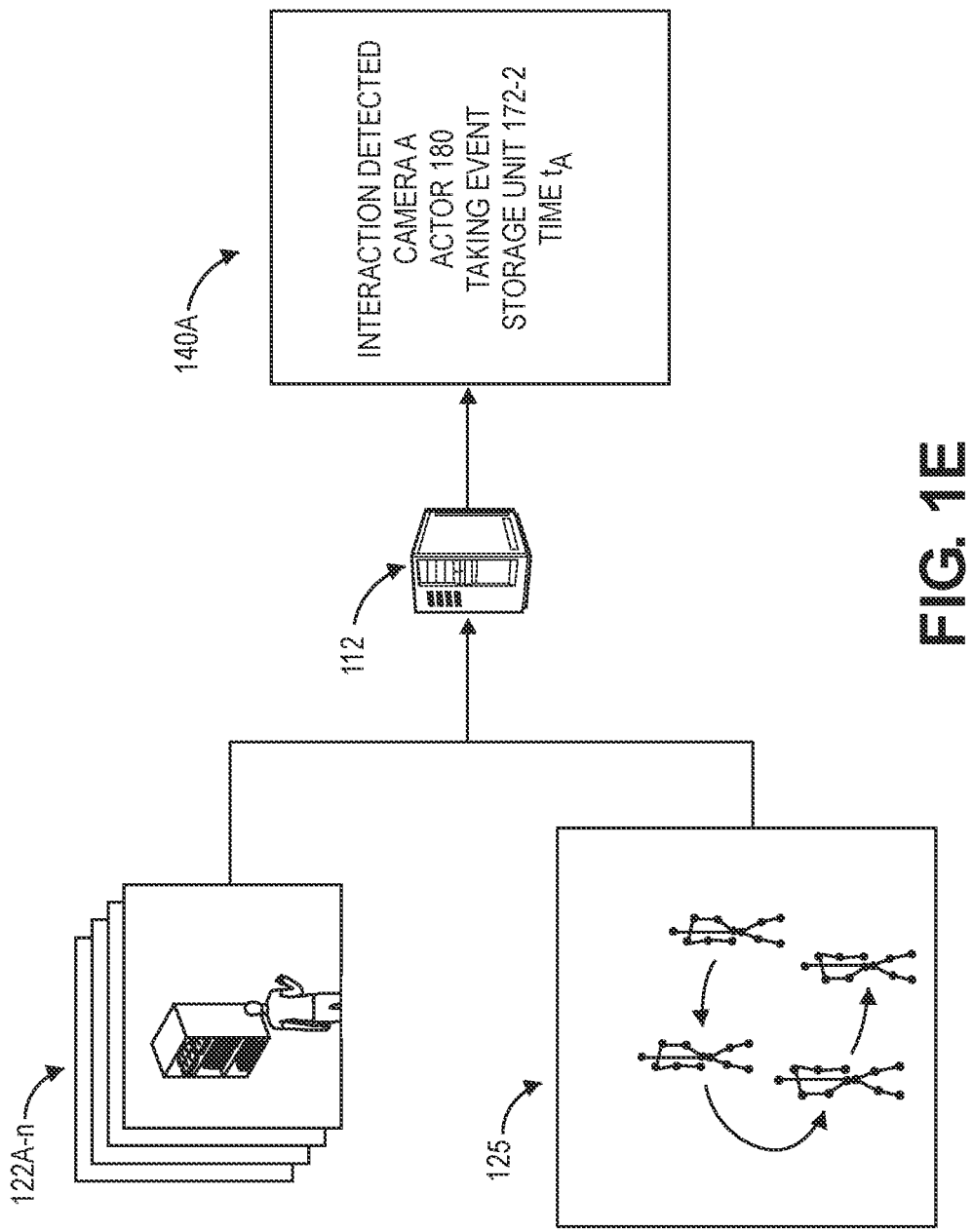

IMAGES CAPTURED BY CAMERA B CROPPED TO INCLUDE ONLY PORTIONS DEPICTING HANDS

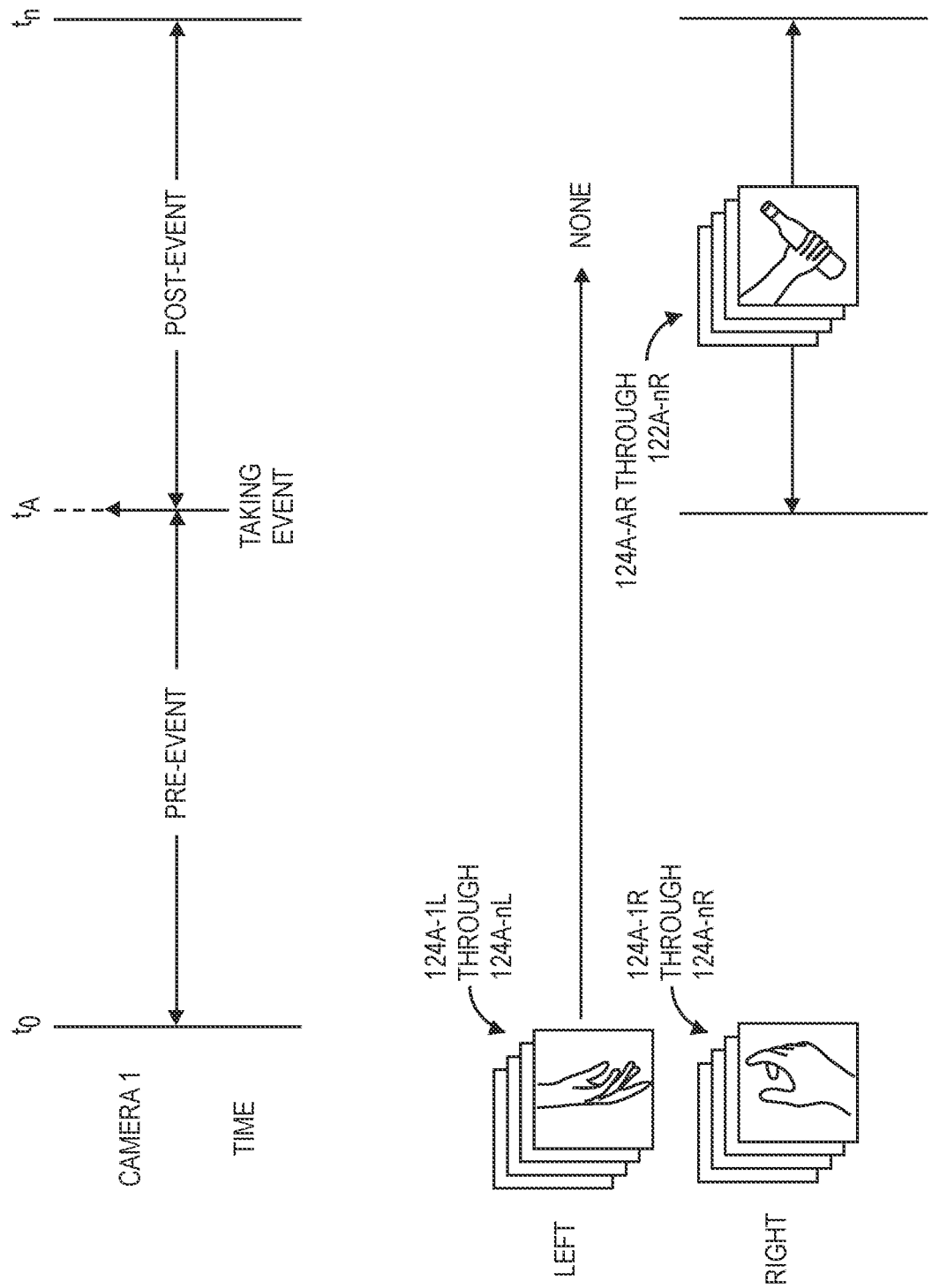

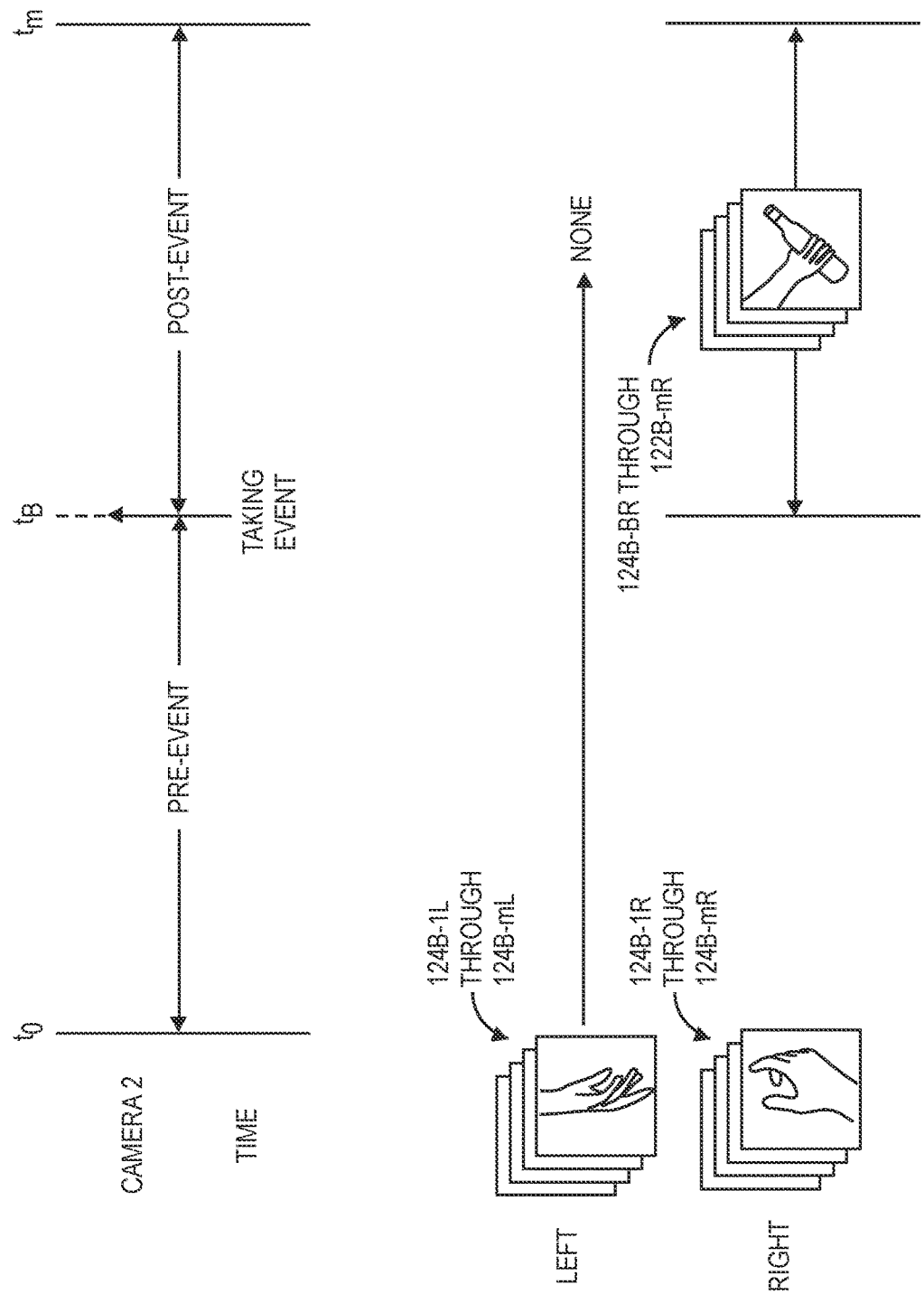
FIG. 1K CAMERA B CROPS FILTERED BASED ON TIME AND NEAREST HAND

DETECTING SHOPPING EVENTS BASED ON CONTENTS OF HANDS DEPICTED WITHIN IMAGES

BACKGROUND

Materials handling facilities such as retail establishments, warehouses or others often store or display items on shelves, platforms or other surfaces or structures. For example, a materials handling facility may include features such as walls, gondola racks or fixtures to which one or more shelves may be mounted or from which such shelves may be suspended, and available items may be disposed upon such shelves. Items may remain on shelves on a temporary basis, until one or more of the items thereon is retrieved therefrom by a customer or an associate at the materials handling facility.

Storing items on shelves or other storage units provides a number of advantages to users of a materials handling facility. For example, items may be stored individually or collectively (e.g., along with other like or identical items), by placing one or more of the items on a surface of a shelf or like element. Furthermore, items may be stored in random locations on a shelf, or in predetermined areas or spaces of the shelf that are set aside for items of a specific type, group or category.

Processes for detecting commercial events within materials handling facilities have been enhanced by improvements in computer and networking technologies, and the development of smaller and more advanced sensors. In bricks-and-mortar commerce, computer-based systems having one or more sensors, such as imaging devices (e.g., cameras), have been integrated into traditional retail establishments in order to aid in theft prevention or inventory tracking. Today, some storage units include load sensors that are provided within shelves or other surfaces, and configured to generate load signals that are commensurate with an extent of loading provided on such shelves or other surfaces.

In some implementations, where an interaction with a given location on a shelf or another surface is detected, e.g., based on images captured by a camera holding the shelf or other surface within a field of view, or based on load signals generated by a load sensor associated with the shelf or other surface, planogram data representing items that are typically stored on the shelf or other surface may be relied upon to identify an item that may have been associated with the interaction. For example, where an item is identified as typically stored on a shelf where an interaction is determined to have occurred, one or more of the items may be associated with a customer, an associate or another user of the materials handling facility who has been determined to have been within a vicinity of the shelf.

Relying on planogram data to identify items involved in an interaction, however, may be subject to one or more inherent limitations. For example, where the planogram data is plagued by one or more errors, and thus fails to accurately identify items stored on a shelf, interactions with the shelf may be improperly assumed to include one or more of the items. Where an associate has mistakenly placed a first item on a shelf that is typically associated with a second item of another type or form, a retrieval of the first item from the shelf by a customer may be presumed to have been a retrieval of the second item, and a record of items associated with the customer may be improperly updated to indicate an addition of the second item. Likewise, where a customer improperly returns a first item to a shelf that is typically associated with a second item of another type or form, the return of the first item to the shelf may be presumed to have been a return of the second item, and a record of items associated with the customer may be improperly updated to indicate a removal of the second item. Systems and methods that rely on planogram data alone to detect retrievals or returns of items are only as accurate as the planogram data itself.

BRIEF DESCRIPTION OF THE DRAWINGS

FIGS. 1A through 1M are views of aspects of one system for detecting events in accordance with implementations of the present disclosure.

DETAILED DESCRIPTION

As is set forth in greater detail below, the present disclosure is directed to systems and methods for detecting events based on contents of hands, as depicted within images. In some implementations, a camera including one or more storage units captures visual images, which are processed to predict whether any of such images depicts an actor executing an event (e.g., a picking or a taking, or a return or a deposit) in association with any number of locations on the storage units. Positions of body parts may be determined from the visual images, and portions of the visual images depicting hands may be cropped therefrom.

The cropped visual images of hands may be filtered to remove images that do not likely depict an item therein, e.g., based on times at which such images were captured, distances of the hands from a location of an event, or a number of items detected within such hands, in order to reduce a number of images or an amount of data to be processed. Once the cropped visual images have been filtered or otherwise reduced in number, the cropped visual images may be processed to generate embeddings, vectors or other sets of data representative of such images and the contents of hands depicted therein. The embeddings, vectors or other sets of data may be compared to corresponding embeddings, vectors or other sets of data generated from reference images of items of a confusion set, which may include one or more items available in inventory at the materials handling facility. An item within a hand of an actor may be identified based on the comparison of the embeddings, vectors or other sets of data, and an event involving the item may be associated with the actor accordingly.

Figure 1A:
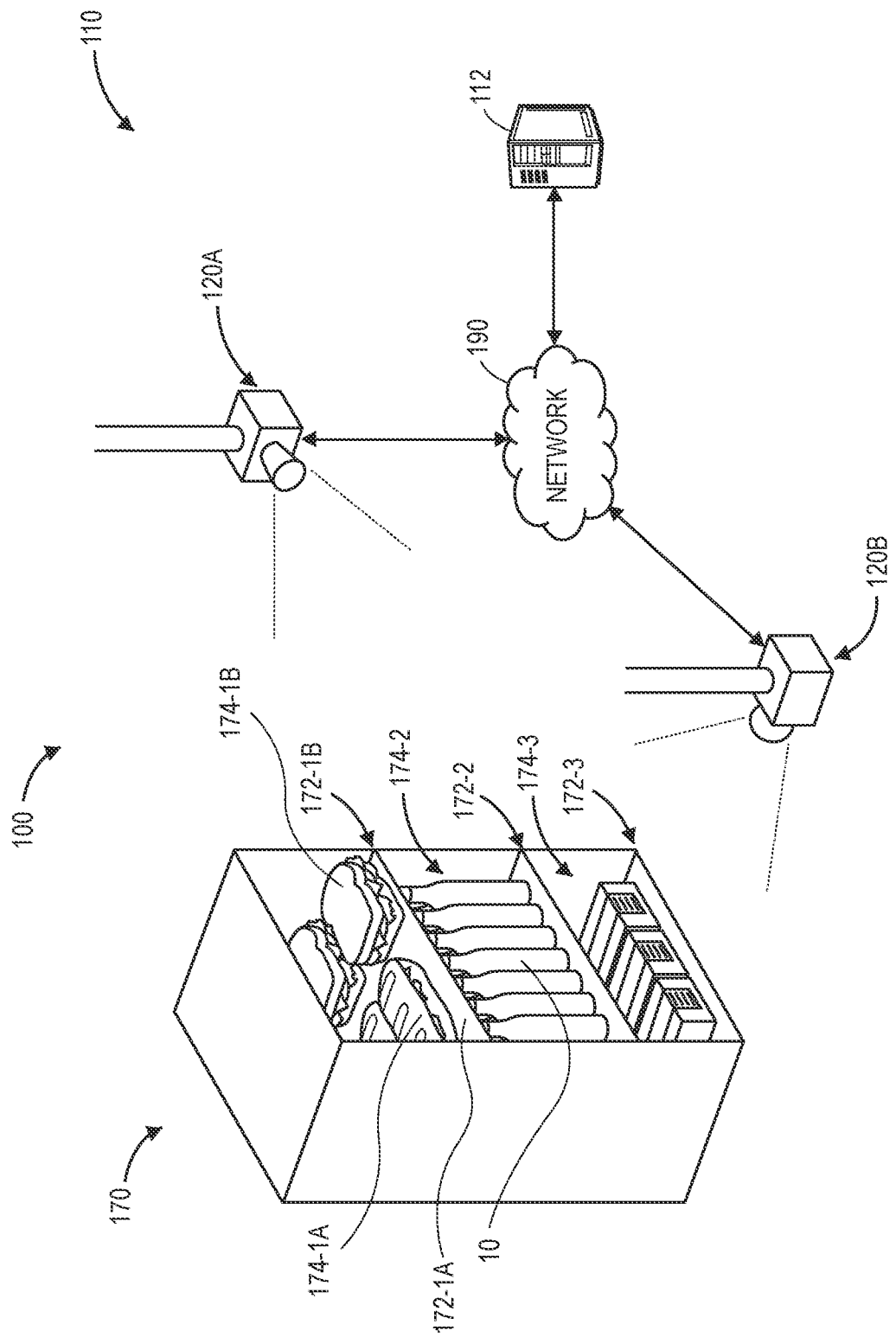

Referring to FIGS. 1A through 1M, views of aspects of one system 100 for detecting events in accordance with implementations of the present disclosure are shown. As is shown in FIG. 1A, the system 100 includes a scene 110 such as a materials handling facility, a fulfillment center, a warehouse, or any other like facility. The scene 110 includes a system 112 (e.g., a server), a plurality of cameras 120A, 120B, and a fixture 170 (e.g., a rack or another set of inventory shelves). The scene 110 may be any open or enclosed environment or space in which any number of actors (e.g., customers, workers or other humans, animals or machines) may execute one or more poses, gestures, movements or other interactions within the fields of view of the cameras 120A, 120B. The fixture 170 includes a plurality of storage units (e.g., portions of or spaces on individual inventory shelves) 172-1A, 172-1B, 172-2, 172-3 of the fixture 170. As is further shown in FIG. 1A, the storage units 172-1A, 172-1B are portions (e.g., lanes or other predefined sections) of a common platform, such as a shelf, of the fixture 170 while the storage units 172-2, 172-3 are entireties of their respective platforms, such as shelves, of the fixture 170.

Each of the storage units 172-1A, 172-1B, 172-2, 172-3 includes a set of items 174-1A, 174-1B, 174-2, 174-3 thereon. For example, each of the sets of items 174-1A, 174-1B includes prepared sandwiches or other prepared foods of a common type or form, while the set of items 174-2 includes bottled beverages, and the set of items 174-3 includes boxed meals or other prepared foods.

The cameras 120A, 120B may include any number of lenses, memory or storage components, photosensitive surfaces, filters, chips, electrodes, clocks, boards, timers, power sources, connectors or any other components. In some implementations, the cameras 120A, 120B may have fields of view that overlap at least in part, and are aligned in different locations and at a non-parallel angle or orientation with respect to one another. In some implementations, the cameras 120A, 120B may be calibrated, such that mappings between coordinates of imaging data captured by the cameras 120A, 120B and directions relative to their respective image sensors are known. Additionally, the cameras 120A, 120B may be installed or otherwise operated independently or as components of an imaging device network (or camera network). For example, the cameras 120A, 120B may be in communication with one or more computer devices or systems (not shown), e.g., over one or more computer networks. Such devices or systems may include one or more databases or other data stores having information regarding attributes that are, have been or might be stored on the fixture 170, e.g., the sets of items 174-1A, 174-1B, 174-2, 174-3 on the storage units 172-1A, 172-1B, 172-2, 172-3. In some implementations, the attributes may include, but need not be limited to, dimensions and/or masses of items, locations on the fixture 170 or the storage units 172-1A, 172-1B, 172-2, 172-3 where the items are typically placed, or colors or textures of surface elements of items (e.g., packaging, wrapping, coverings or the like), or any other attributes. Alternatively, in some implementations, the scene 110 may include two or more cameras 120A, 120B provided in a common housing, such as cameras having fields of view extending from surfaces provided at a dihedral angle of greater than one hundred eighty degrees, e.g., approximately two hundred twenty-five degrees.

The cameras 120A, 120B may be configured to capture visual images (e.g., color, grayscale, or black-and-white images), or any other type or form of imaging data (e.g., depth images). In some implementations, the cameras 120A, 120B may include one or more sensors that are configured to capture visual imaging data at relatively high levels of resolution, any number of pixels (e.g., eight to nine megapixels) per image, and at relatively high frame rates, e.g., fifteen or more frames per second (fps). Such sensors may include arrays of photodetectors or photosensitive components such as charge coupled devices ("CCD"), complementary metal-oxide sensors ("CMOS"), photodiodes, or the like. The sensors may capture light scattered or reflected from objects and assign one or more quantitative values (e.g., red, green, blue or other color values, or distances or ranges to such objects) to aspects of the scattered or reflected light. Alternatively, or additionally, in some implementations, the cameras 120A, 120B may be configured to capture any other imaging data, such as depth imaging data, or visual imaging data at any levels of resolution or frame rates.

As is shown in FIG. 1A, the cameras 120A, 120B are in communication with the system 112 over the network 190, which may include the Internet in whole or in part. Alternatively, or additionally, either of the cameras 120A, 120B may be in communication with one another, or with any number of other external devices or systems, e.g., by one or more network connections (not shown). Additionally, in some implementations, the cameras 120A, 120B may be self-powered, e.g., by one or more power sources internal to or onboard the cameras 120A, 120B, such as batteries or fuel cells. In some other implementations, however, the cameras 120A, 120B may receive alternating current (or AC) or direct current (or DC) power from one or more external power sources, e.g., by one or more conductors or other connectors. For example, the cameras 120A, 120B may receive power by a dedicated connection to external devices or systems, or power sources, e.g., according to a Power over Ethernet (or "PoE") or a Universal Serial Bus Type-C ("USB-C") standard or system that may also be utilized to transfer information or data to or from the cameras 120A, 120B.

Figure 1B:
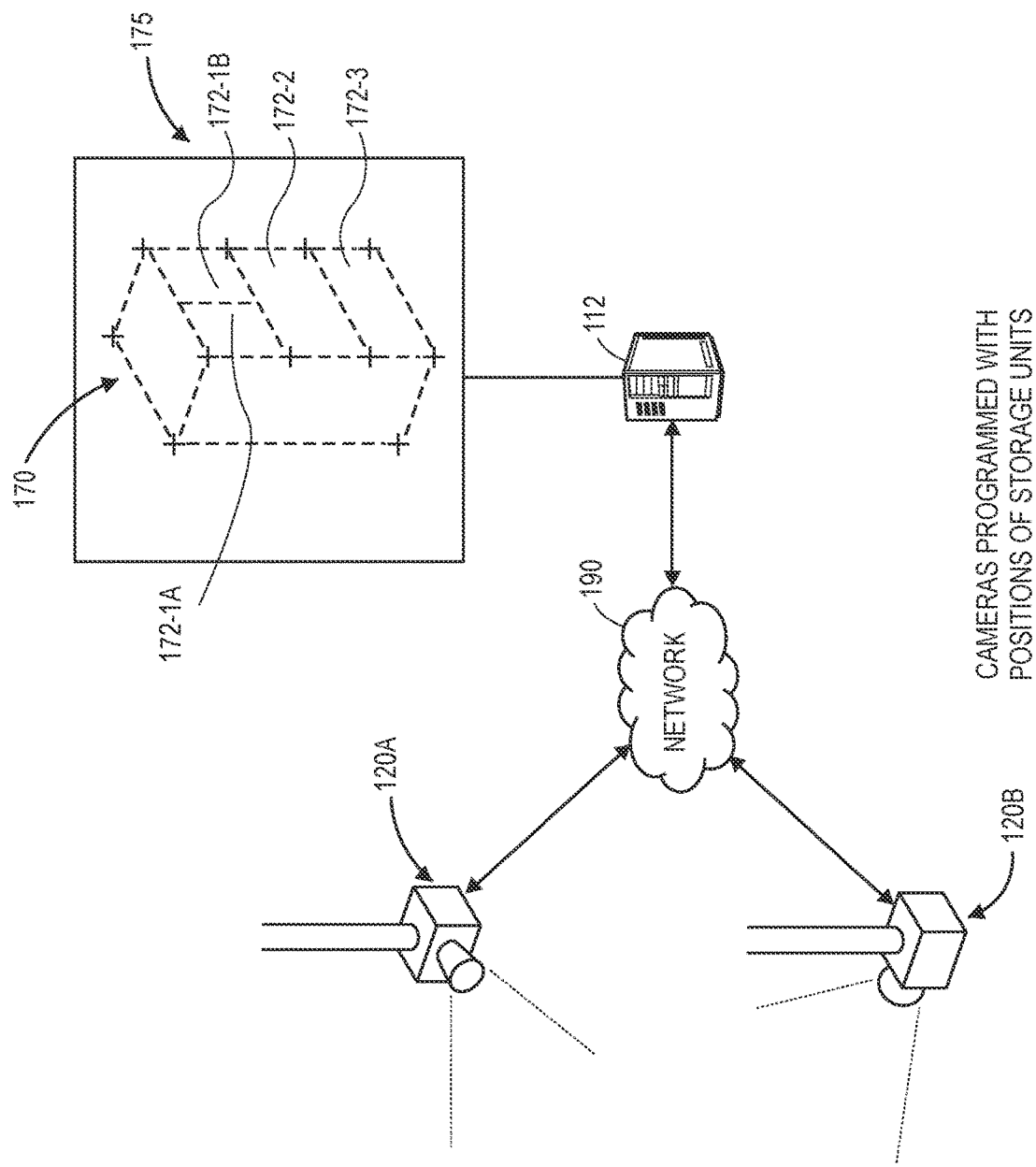

As is shown in FIG. 1B, each of the cameras 120A, 120B is programmed with position data 175 regarding aspects of the fixture 170 and the storage units 172-1A, 172-1B, 172-2, 172-3, which may be stored on or received from the system 112. For example, each of the cameras 120A, 120B may be programmed with coordinates or other position data representing locations of aspects of the fixture 170, or of the individual storage units 172-1A, 172-1B, 172-2, 172-3 thereon, in three-dimensional (or "3D") space. The position data 175 may describe or represent areas or volumes including the fixture 170 as a whole, or the individual storage units 172-1A, 172-1B, 172-2, 172-3. The position data 175 may represent positions of the fixture 170 or each of the storage units 172-1A, 172-1B, 172-2, 172-3 in any manner, and with any level of granularity or specificity. For example, such positions may be represented in 3D space by a set of Cartesian coordinates, or coordinates according to any other system, e.g., a local coordinate system unique to the scene 110.

The position data 175 may be updated from time to time, as necessary, where positions or numbers of the fixture 170 or the storage units 172-1A, 172-1B, 172-2, 172-3, change for any reason. Moreover, although the scene 110 shown in FIG. 1A includes one fixture 170 having four storage units 172-1A, 172-1B, 172-2, 172-3 on three shelves or other platforms, and two cameras 120A, 120B having the fixture 170 and the storage units 172-1A, 172-1B, 172-2, 172-3 within their respective fields of view, the systems and methods of the present disclosure may be utilized in connection with scenes (e.g., portions of materials handling facilities) having any number of fixtures, storage units or cameras. Alternatively, in some implementations, the cameras 120A, 120B need not be programmed with the position data 175.

Figure 1C:
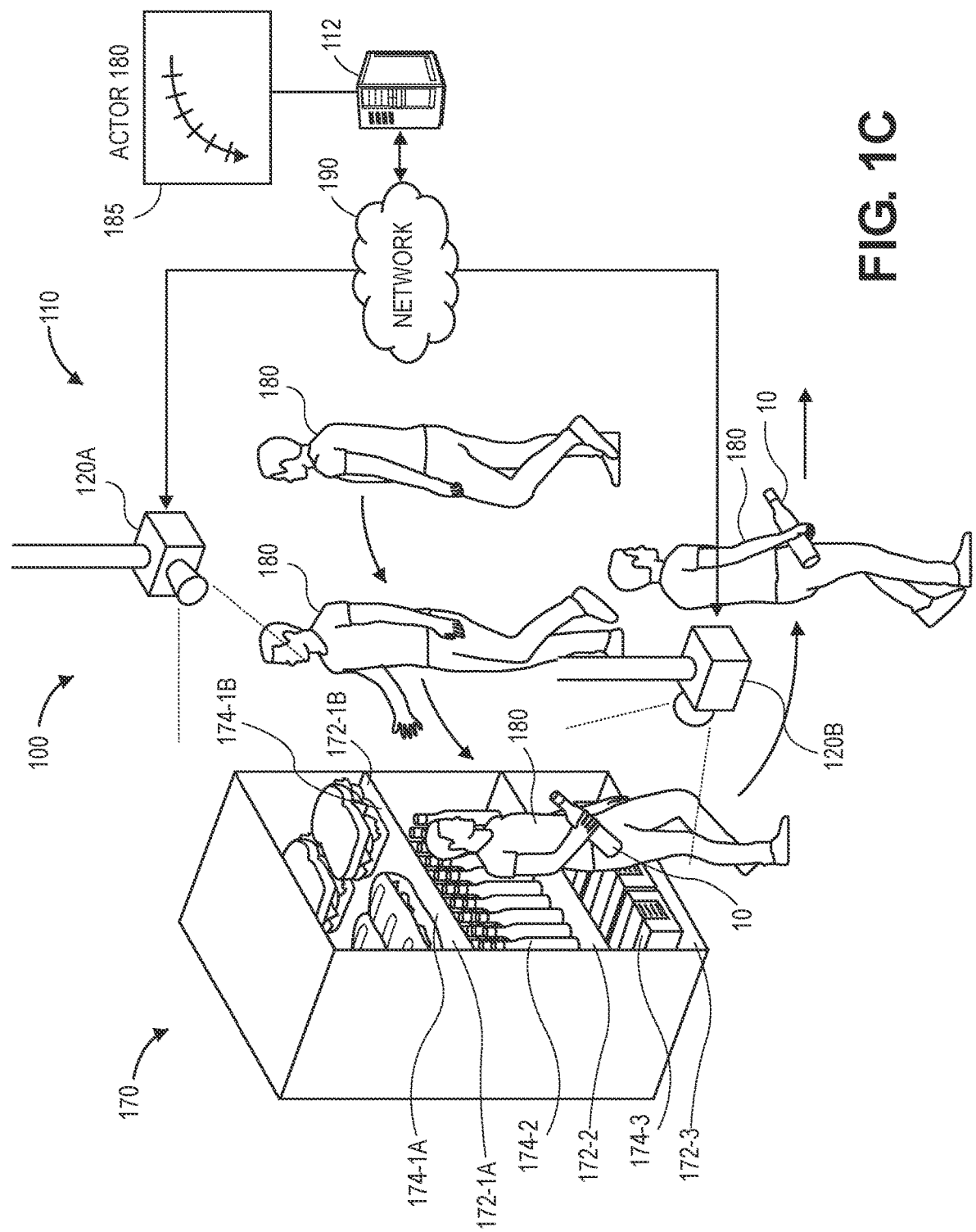

As is shown in FIG. 1C, an actor 180 (e.g., a customer, a worker or another human) executes one or more poses, gestures or other actions to retrieve an item 10 from the set of items 174-2 on the storage unit 172-2 of the fixture 170. Locating data (or tracking data) 185 regarding the actor 180 is provided to each of the cameras 120A, 120B by the system 112. The locating data 185 may include, but need not be limited to, an identifier of the actor 180, or one or more visual descriptors of pixels depicting the actor 180, including but not limited to appearance features of the actor 180, e.g., sets of information or data identifying colors, textures, shapes or other aspects of features of the actor 180, as well as a record of the positions of an actor at various times beginning at an initial detection and following with subsequent detections by one or more sensors. In some implementations, some or all of the locating data 185 may have been captured, determined or generated by either or both of the cameras 120A, 120B. In some other implementations, the locating data 185 may have been generated by the system 112, or by another computer system in communication with the system 112. For example, in some implementations, actors may be identified upon entering the scene 110, e.g., by scanning or interpreting a virtual credential or a physical credential, such as a sheet of paper, a mobile device having a display bearing a bar code (e.g., a one-dimensional or two-dimensional bar code, such as a QR bar code) or other symbol or marking that may be borne or presented by the actors at an entrance to the scene 110, or at another location associated with the scene 110. Alternatively, or additionally, actors may be identified upon entering the scene 110 by scanning or interpreting one or more body parts of such actors, such as hands of such actors, e.g., palms of such hands, which may be presented to one or more sensors by such actors at an entrance to the scene 110, or at another location associated with the scene 110.

Each of the cameras 120A, 120B is configured to capture images at a constant frame rate, and to process such images to determine whether any of such images depict one or more body parts of an actor, e.g., a customer, a worker or another human. As the actor 180 executes the one or more poses, gestures or other actions within the fields of view of the cameras 120A, 120B, images captured by the cameras 120A, 120B are processed to detect any body parts of the actor 180 that are depicted within such images, and to determine positions of such body parts in 3D space. In some implementations, each of the cameras 120A, 120B may be configured to execute one or more machine learning models, e.g., a deep neural network, a convolutional neural network or a support vector machine operating thereon, to detect body parts or positions thereof.

Figure 1D:
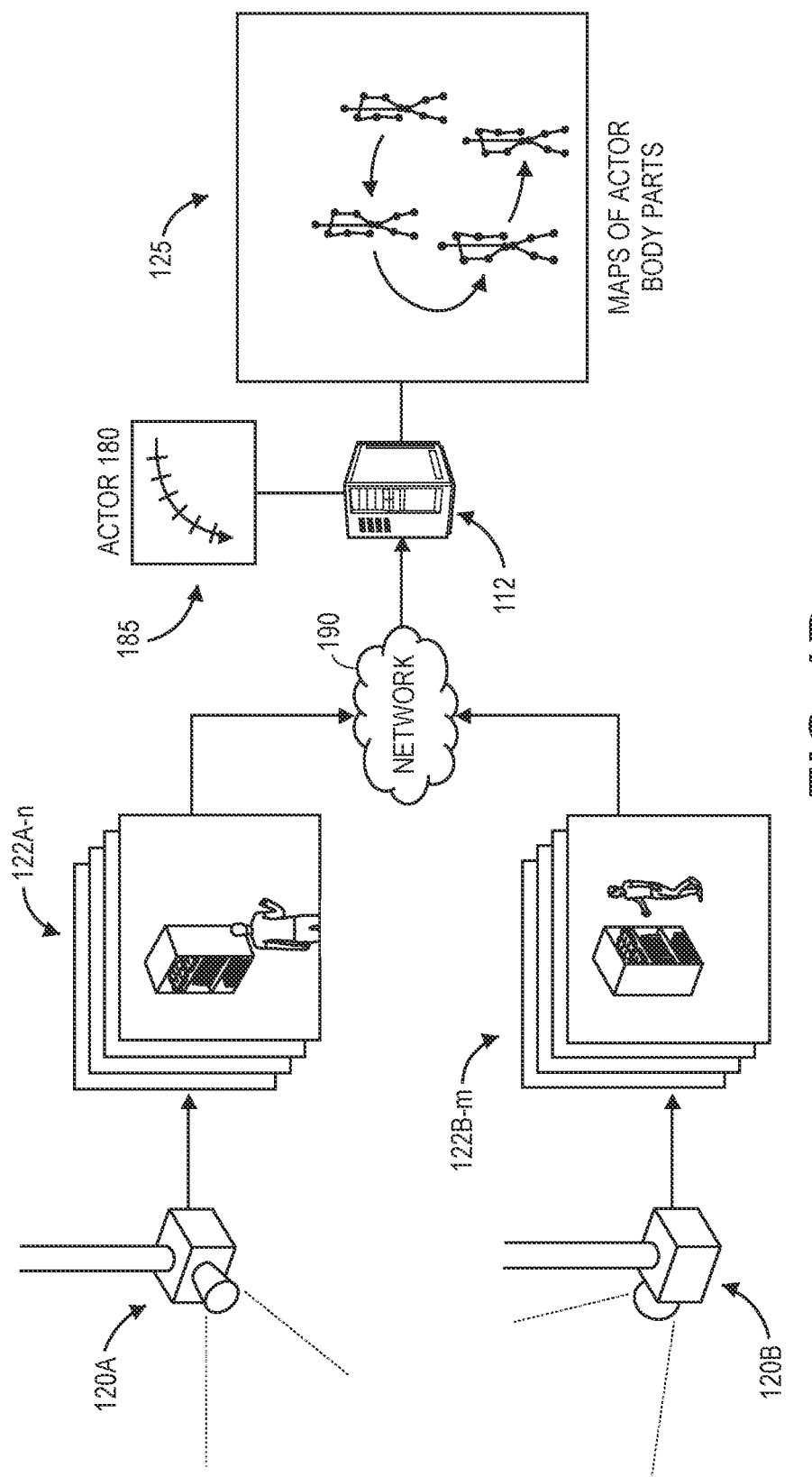

As is shown in FIG. 1D, a set of maps 125 of body parts of the actor 180 is generated based on images 122A-n captured by the camera 120A and images 122B-m captured by the camera 120B and the locating data 185. For example, the cameras 120A, 120B may capture and process the images 122A-n and the images 122B-m to determine whether any of such images depict any body parts such as heads, arms, hands, torsos or portions thereof. The cameras 120A, 120B may be configured to execute a body part detection module (e.g., an algorithm, system or technique), which may be an artificial neural network, such as a convolutional neural network, or any other machine learning model, such as a segmentation network, that is trained to identify such body parts depicted within an image. In some implementations, a body part detection module may generate a segmentation record identifying segments of an image depicting body parts and their respective locations within the image. In some implementations, a body part detection module may be configured to detect portions of a body part, including but not limited to multiple portions of the same body part, e.g., an upper arm and a lower arm, or a thumb and a palm. Alternatively, the cameras 120A, 120B may detect body parts of the actor 180 within the images 122A-n and the images 122B-m in any other manner, such as based on local or maximum peak values within score maps generated for each of a plurality of body parts from outputs generated by one or more machine learning models operating thereon. In some implementations, the cameras 120A, 120B may also process the images 122A-n and the images 122B-m to determine positions of body parts depicted therein based on one or more monocular cues within the field of view of the cameras 120A, 120B or in any other manner.

Upon detecting one or more body parts within the images 122A-n and the images 122B-m, the cameras 120A, 120B may identify attributes of portions or segments of the images 122A-n and the images 122B-m, depicting body parts, e.g., by image segmentation, image filtering, image smoothing and/or image localization, and may determine and store attributes of such sets of pixels, or the sets of pixels themselves, in one or more data stores. The cameras 120A, 120B may further associate two or more of the body parts detected within the images 122A-n and the images 122B-m with one another. For example, the cameras 120A, 120B may generate vectors of regression identifying pairs of body parts that are associated with one another, and assign probabilities that the pairs of body parts belong to a common actor, e.g., based on any number of physiological parameters or constraints, as well as any metrics of compatibility or incompatibility.

The maps 125 may include or represent positions of body parts of the actor 180 detected within the images 122A-n and the images 122B-m. Alternatively, body parts of actors, viz., the actor 180, may be represented in any manner in accordance with implementations of the present disclosure. For example, body parts of the actor 180 may be represented in a skeleton or any other representation, e.g., a parametric representation, which may be expressed within a two-dimensional image plane, or in 3D space, or according to any other standard.

Detections of body parts within the images 122A-n and the images 122B-m or generations of the maps 125 may be performed by the cameras 120A, 120B or the system 112, or any other computer system. For example, each of the cameras 120A, 120B may independently capture images, detect body parts of the actor 180 depicted within such images and generate a map 125 or another representation of the body parts of the actor 180 from such detections, e.g., representing locations of the body parts within a two-dimensional image plane of the camera 120A, 120B, or positions of the body parts in 3D space. Alternatively, the system 112 may receive the images 122A-n and the images 122B-m from the cameras 120A, 120B and detect body parts of the actor 180 and generate a map of the body parts of the actor 180 from such detections. In still other implementations, the system 112 may receive locations of body parts of the actor 180 detected by the cameras 120A, 120B from images captured thereby, and generate the maps 125 or other representations of such body parts based on such detections.

Images captured by the cameras 120A, 120B may be processed along with the maps 125 to determine or predict whether an interaction occurred, as well as an identity of an actor involved in the interaction, a type of the interaction, a location (or a storage unit) of the interaction, and a time (or a duration) of the interaction. For example, as is shown in FIG. 1E, the system 112 determines that the actor 180 executed a taking event at the storage unit 172-2 at a time $t_4$, based on the images 122A-n captured by the camera 120A and the maps 125, and generates a record 140A of an interaction including data regarding the taking event. In some implementations, the images 122A-n and the maps 125 may be provided to an interaction detection module or another application or component provided on the camera 120A or executed by the system 112 that is configured to determine whether such visual images depict any number of interactions (or events). For example, the interaction detection module may be or include a machine learning system (e.g., a convolutional neural network, a deep learning neural network, or other system or technique) having one or more output layers for calculating regressions between pixels depicting body parts and pixels depicting locations such as item spaces, or lanes, within such images, or for generating regression vectors associating one or more of the body parts with locations on the storage unit where an event may have occurred, and calculate confidence scores in such regression vectors. Regression vectors may take the form of a coordinate pair, e.g., an (x, y) pair identifying a pixel depicting a body part of an actor within an image plane of the image, and confidence scores may range between zero and one, or have any other value.

As is shown in FIG. 1E, the record 140A may identify the actor 180 detected in the images 122A-n or based on the maps 125, and classify the interaction as one of a picking or taking event (or a retrieval) by the actor 180, a return or deposit event (or a placement) by the actor 180, no events (e.g., neither pickings or takings nor returns or deposits, or any retrievals or placements) by the actor 180, or a multiple event (e.g., one or more pickings or takings and also one or more returns or deposits, or one or more retrievals and one or more placements) by the actor 180. The record 140A may also include a confidence score associated with a classification of the event.

In some implementations, the record 140A may be a time series or other set of data in a file (e.g., a spreadsheet) or record that includes values of data determined from the images 122A-n captured by the camera 120A, and times (e.g., time stamps) at which each of such images 122A-n was captured. For example, the record 140A may be a matrix or an array, e.g., a sparse matrix or a sparse array, having at least two dimensions, including a dimension (e.g., a row or a column) corresponding to time stamps of each of the images 122A-n, and a dimension (e.g., a column or a row) corresponding to variables for each of any number of features, such as body part locations, distances from locations of such body parts to locations of items, or other features, at each of the times of such time stamps.

Figure 1F:
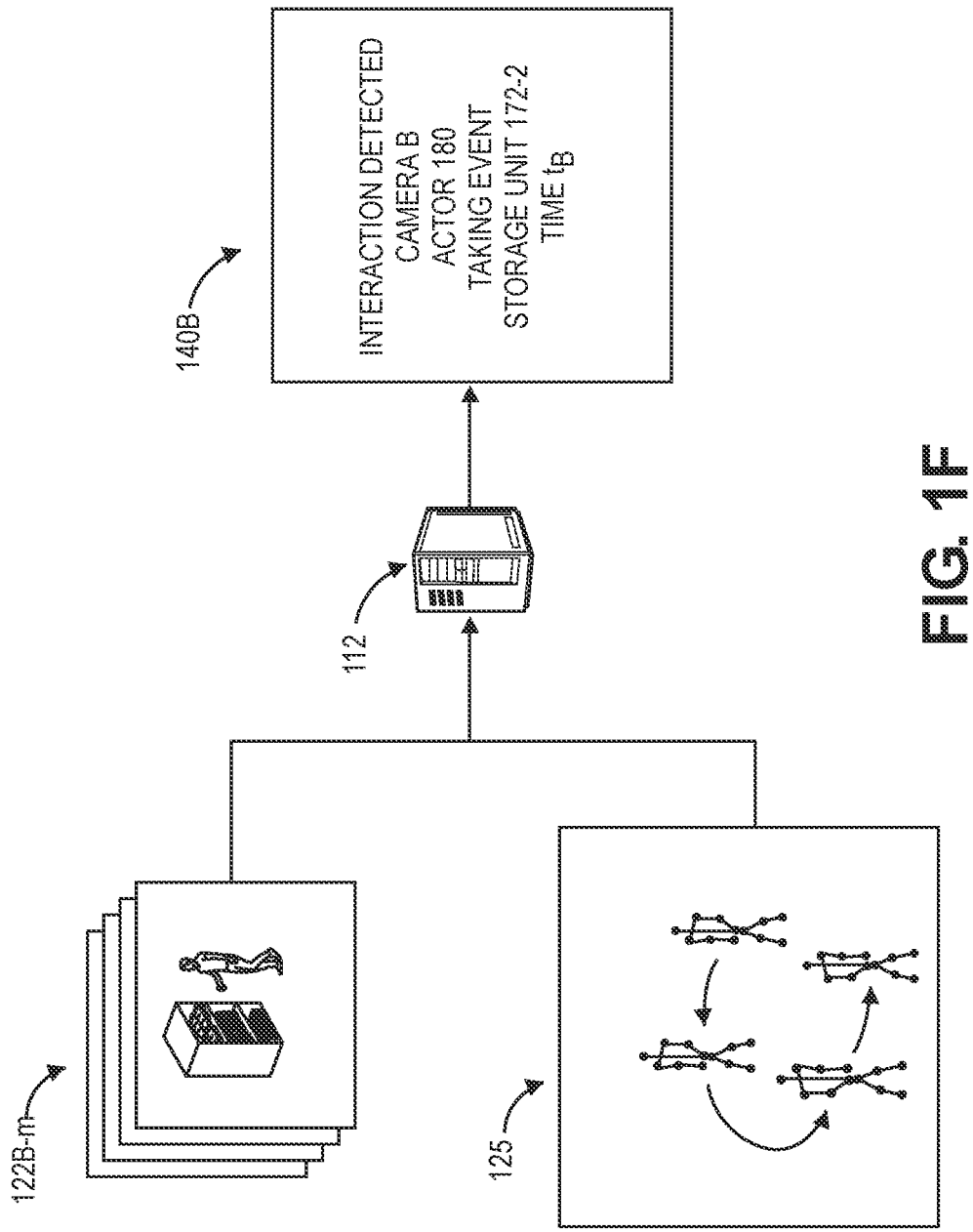

Similarly, as is shown in FIG. 1F, the system 112 determines that the actor 180 executed a taking event at the storage unit 172-2 at a time $t_B$, based on the images 122B-m captured by the camera 120B and the maps 125, and generates a record 140B of an interaction including data regarding the taking event.

Figure 1G:
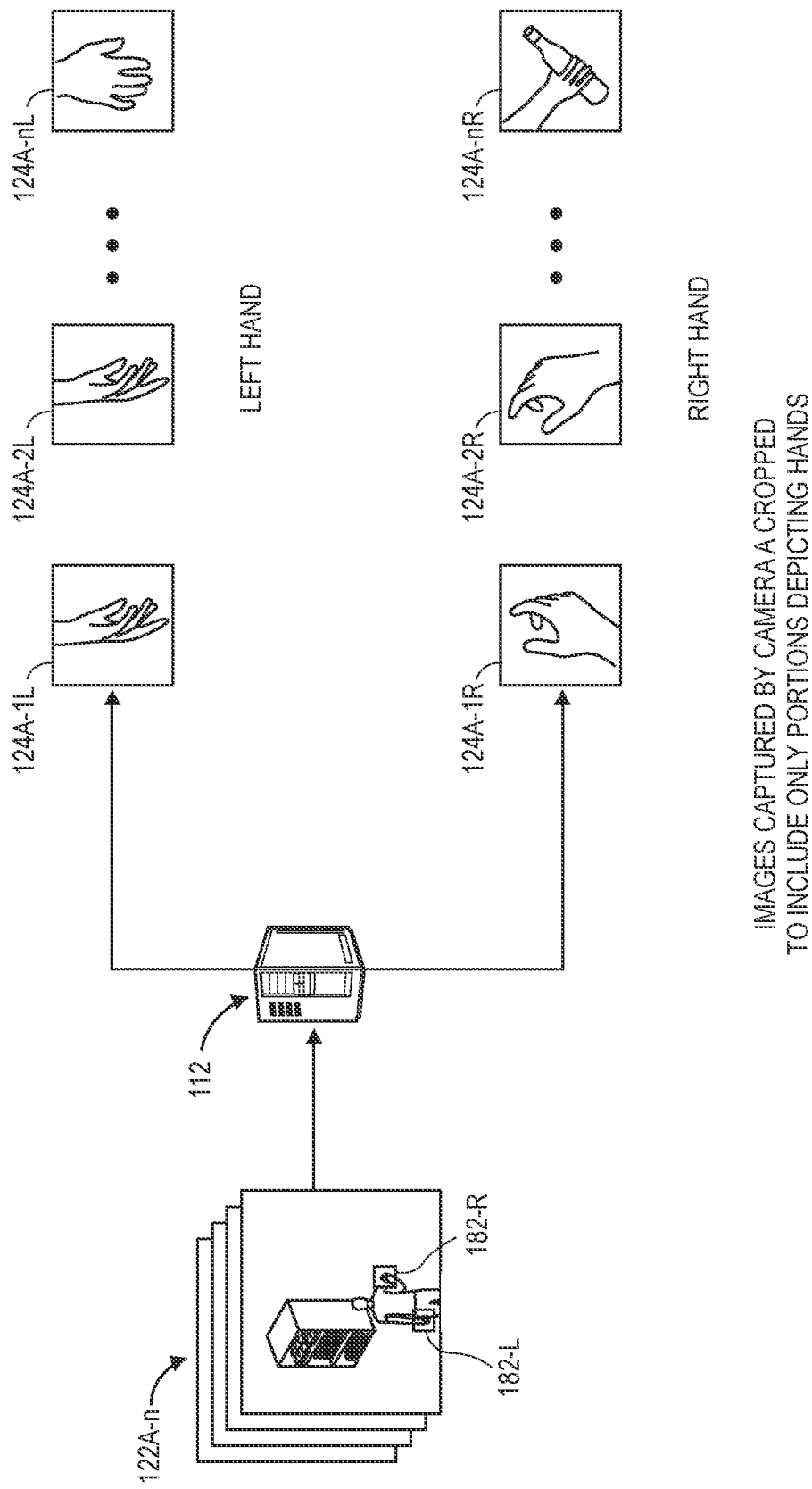
Figure 1H:
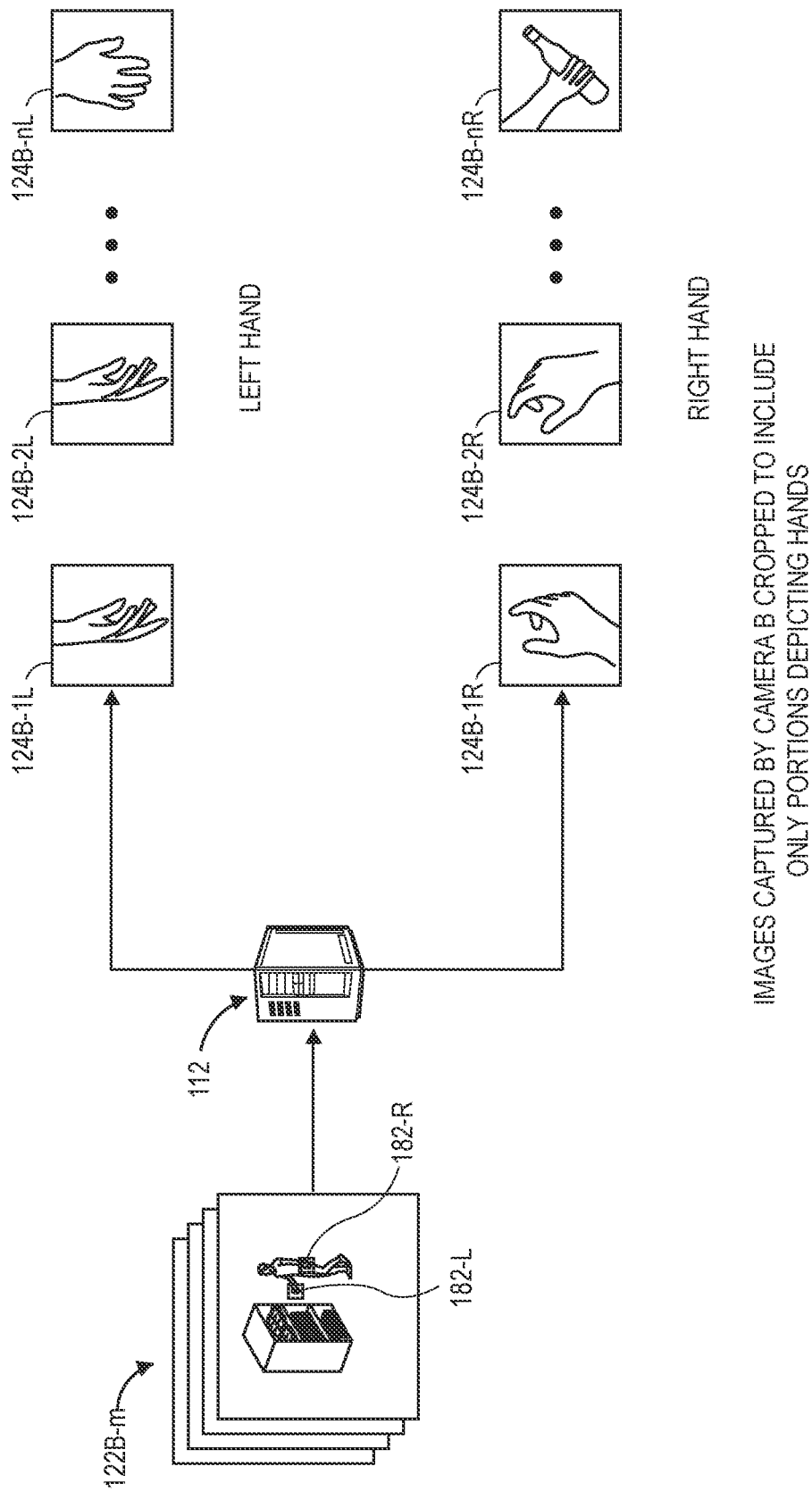
Figure 11:
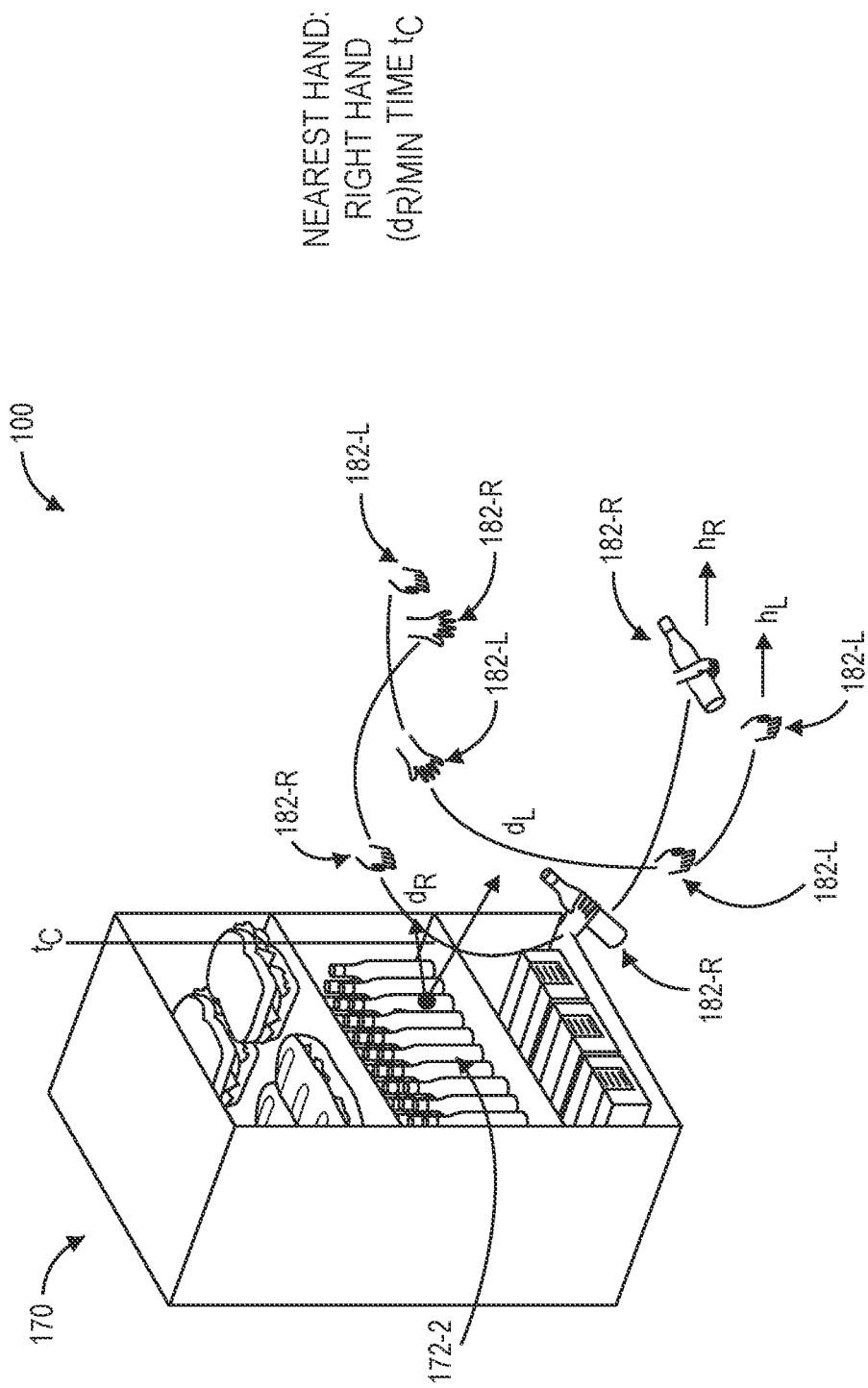

As is shown in FIG. 1G, the images 122A-n captured by the camera 120A may be processed to identify portions of the images 122A-n that depict hands, and crop such portions from the images 122A-n. For example, as is shown in FIG. 1G, portions 124A-1L, 124A-2L . . . 124A-nL of the images 122A-n depicting a left hand of the actor 180 and portions 124A-1R, 124A-2R . . . 124A-nR of the images 122A-n depicting a right hand of the actor 180 are identified and cropped therefrom. Likewise, as is shown in FIG. 1H, the images 122B-m captured by the camera 120B may be processed to identify portions of the images 122B-m that depict hands, and crop such portions from the images 122B-m.

As is shown in FIG. 1I, trajectories $h_L$, $h_R$ of a left hand 182-L and a right hand 182-R of the actor 180 may be determined and processed to calculate distances $d_L$, $d_R$ between such hands and the location of the taking event, viz., the storage unit 172-2. The trajectories $h_L$, $h_R$ may be determined from the positions of the body parts represented in the maps 125, or based on the images 122A-n, 122B-m captured by each of the cameras 120A, 120B.

Based on the trajectories $h_L$, $h_R$ of the hands 182-L, 182-R and a position of the storage unit 172-2, e.g., a center of a front face or other portion of the storage unit 172-2, the distances $d_L$, $d_R$ between such hands and the storage unit 172-2 may be determined over time. A nearest hand, or one of the hands 182-L, 182-R having a shortest of the distances $d_L$, $d_R$ to the storage unit 172-2, may be identified accordingly. For example, as is shown in FIG. 1I, the right hand 182-R is identified as having been a nearest hand of the actor 180 to the location of the event, viz., the storage unit 172-2, based on minimum values of the distances $d_L$, $d_R$ determined from the trajectories $h_L$, $h_R$ of the hands 182-L, 182-R, or in any other manner. A time $t_C$ at which a smallest one of the distances $d_L$, $d_R$ is calculated, viz., the minimum distance $(d_R)_{MIN}$ between the right hand 182-R and the storage unit 172-2, may be determined accordingly.

In accordance with implementations of the present disclosure, cropped visual images of hands may be filtered based on a time of an event, a location of an event, and a proximity of such hands to the location of the event. As is shown in FIG. 1J, the images 124A-1R through 124A-nR of the right hand 182-R of the actor 180 cropped from the images 122A-n captured by the camera 120A as shown in FIG. 1G are filtered to remove images captured prior to the time $t_A$ of the taking event detected based on such images 122A-n. Thus, only the cropped images 124A-AR through 124A-nR of the right hand 182-R that were captured after the time $t_A$ and prior to a time $t_n$ at which a last one of the images 122A-n was captured need be considered, and all others may be disregarded as unlikely to depict an item within the right hand 182-R.

Because the right hand 182-R of the actor 180 passed closest to the location of the event, viz., the storage unit 172-2, images of the left hand 182-L of the actor 180 cropped from the images 122A-n captured by the camera 120A as shown in FIG. 1G need not be considered, as such images may be disregarded as unlikely to depict an item associated with the event.

Alternatively, had the event detected within the images 122A-n captured by the camera 120A been classified as a return event, the images 124A-1R through 124A-nR of the right hand 182-R of the actor 180 cropped from the images 122A-n would have been filtered to remove images captured after the time $t_A$ of the return event. Likewise, had the left hand 182-L been determined to have a minimum distance $d_L$ to the storage unit 172-2, the images 124A-1L through 124A-nL of the left hand 182-L of the actor 180 cropped from the images 122A-n would have been filtered to remove cropped images of the right hand 182-R.

Similarly, as is shown in FIG. 1K, the images 124B-1R through 124B-mR of the right hand 182-R of the actor 180 cropped from the images 122B-m captured by the camera 120B as shown in FIG. 1H are filtered to remove images captured prior to the time $t_B$ of the taking event detected based on such images 122B-m. Thus, only the cropped images 124B-BR through 124B-mR of the right hand 182-R that were captured between the time $t_B$ and the time $t_m$ at which a last one of the images 122B-m was captured need be considered, and all others may be disregarded as unlikely to depict an item within the right hand 182-R.

Because the right hand 182-R of the actor 180 passed closest to the location of the event, viz., the storage unit 172-2, images of the left hand 182-L of the actor 180 cropped from the images 122B-m captured by the camera 120B as shown in FIG. 1H need not be considered, as such images may be disregarded as unlikely to depict an item associated with the event.

Additionally, cropped images of hands may be further processed to count the items depicted within such images, and filtered to include only cropped images depicting single items within hands of such images, and to exclude cropped images depicting no items, or multiple items, within hands of such images. As is shown in FIG. 1L, the images 124A-AR through 124A-nR, filtered as shown in FIG. 1J, are further filtered to include only images captured by the camera 120A that depict a single item within the right hand 182-R of the actor 180, viz., the images 124A-7R, 124A-9R, 124A-12R, 124A-16R.

Figure 1L:
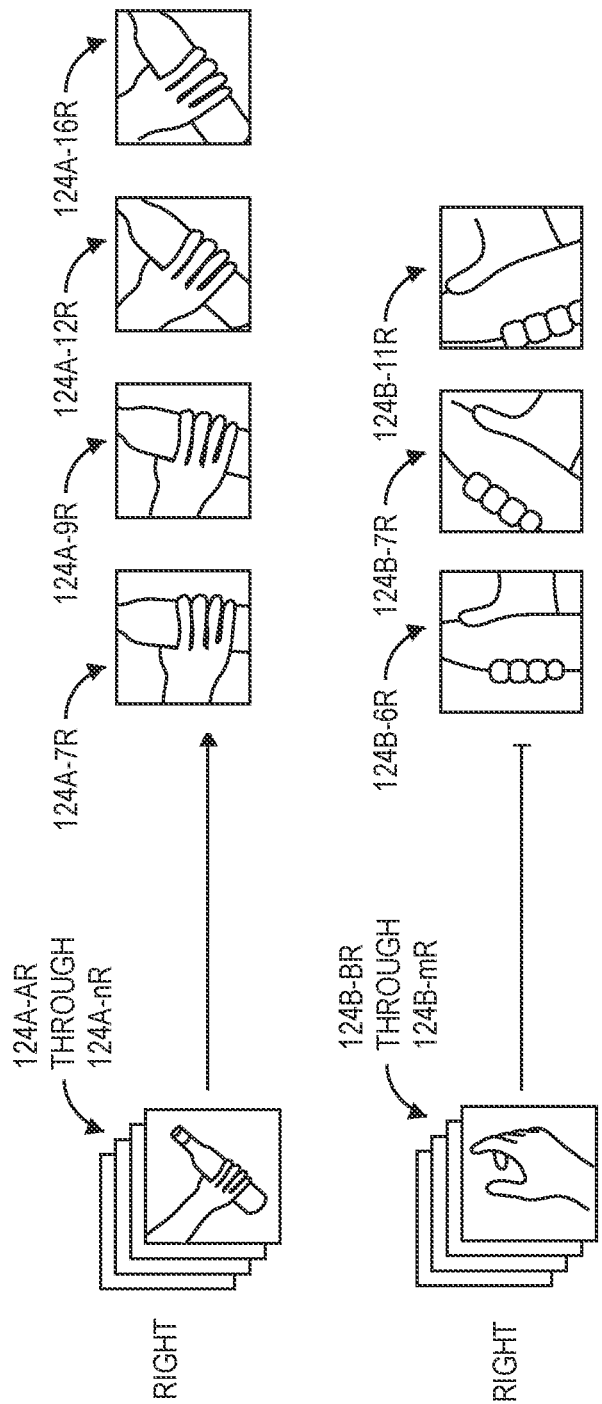

Likewise, as is also shown in FIG. 1L, the images 124B-BR through 124B-mR, filtered as shown in FIG. 1K, are further filtered to include only images captured by the camera 120B that depict a single item within the right hand 182-R of the actor 180, viz., the images 124B-6R, 124B-7R, 124B-11R.

In some implementations, a number of items depicted within a cropped image of a hand may be determined by one or more machine learning algorithms, systems or techniques. For example, in some implementations, the cropped images may be provided to a crop-level classifier, which may generate per-crop scores or indicia of a quantity of items depicted within each of the cropped images, e.g., a single quantity, a multiple quantity, or zero quantity, and to an event-level classifier, which may receive the per-crop scores and generate an overall quantity of items involved in an event based thereon. Alternatively, a number of items depicted within a cropped image of a hand may be determined in any other manner, and the cropped image may be filtered based on the number of items accordingly, as necessary.

Figure 1M:
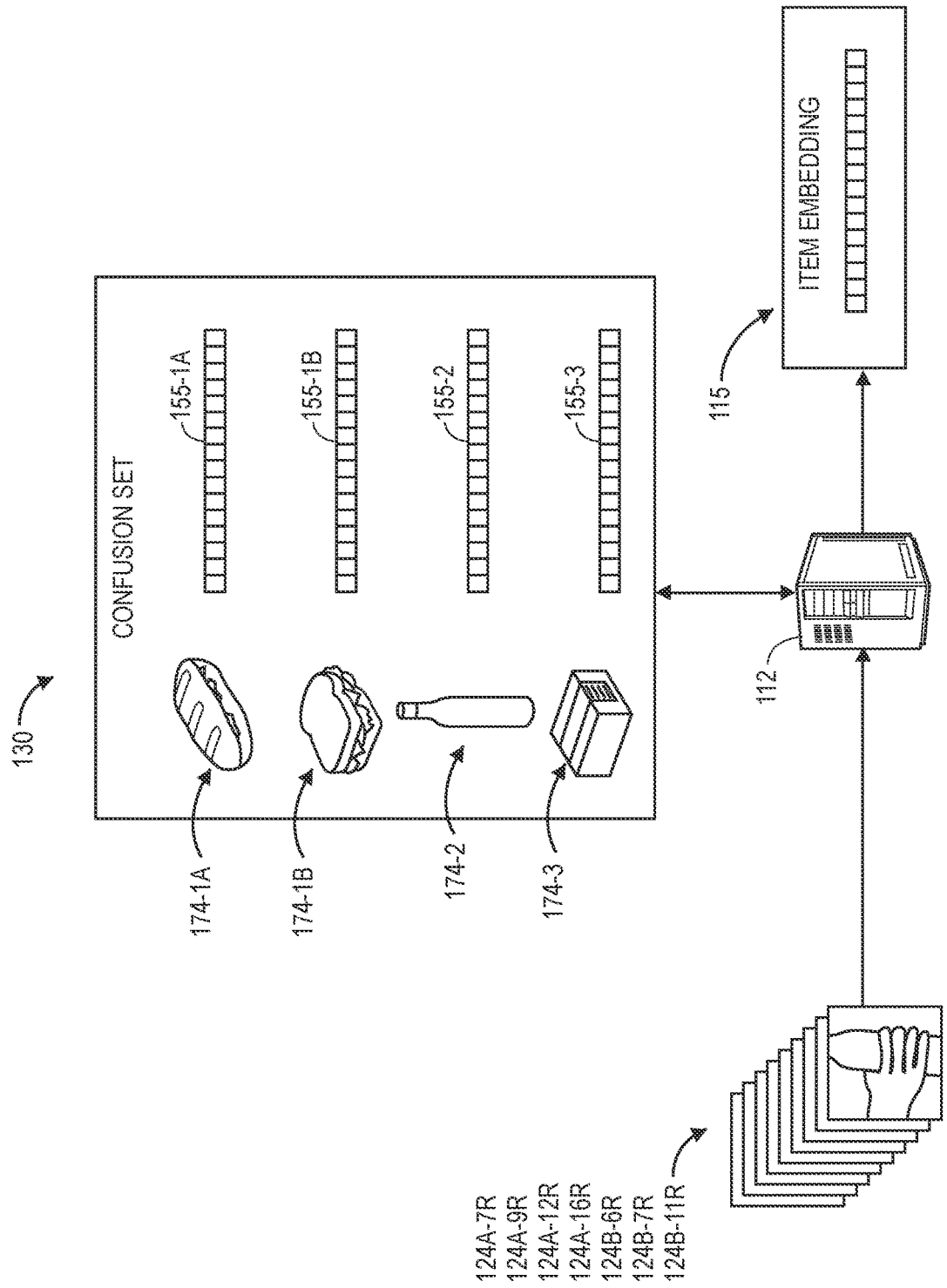

As is shown in FIG. 1M, after the images captured by the cameras 120A, 120B have been cropped and filtered based on a type of an event (e.g., a picking or taking, a return or deposit), a time of the event, and distances of hands depicted within the images from a location of the event, the images 124A-7R, 124A-9R, 124A-12R, 124A-16R, 124B-6R, 124B-7R, 124B-11R identified thereby may be processed to generate an embedding 115 representative of the item depicted therein.

The embedding 115 generated based on the images 124A-7R, 124A-9R, 124A-12R, 124A-16R, 124B-6R, 124B-7R, 124B-11R may be a representation or a vector representative of a visual appearance of the item within the hands depicted within the images 124A-7R, 124A-9R, 124A-12R, 124A-16R, 124B-6R, 124B-7R, 124B-11R, which may be implicitly embodied in the representation and need not be readily interpreted as representing any semantic attributes. The embedding 115 may have any length or number of digits or values in accordance with implementations of the present disclosure. In some implementations, the embedding 115 may be generated by a machine learning algorithm, system or technique, such as a transformer that considers features generated from images, or any other information, data or metadata regarding the item.

Once the embedding 115 has been generated based on the filtered cropped visual images, viz., the images 124A-7R, 124A-9R, 124A-12R, 124A-16R, 124B-6R, 124B-7R, 124B-11R, the embedding 115 may be compared to a confusion set 130 including a plurality of items in inventory, e.g., the items 174-1A, 174-1B, 174-2, 174-3 on the storage units 172-1A, 172-1B, 172-2, 172-3 of the fixture 170. The confusion set 130 includes information or data regarding the items 174-1A, 174-1B, 174-2, 174-3, such as an embedding 155-1A generated based on one or more reference images of the item 174-1A, an embedding 155-1B generated based on one or more reference images of the item 174-1B, an embedding 155-2 generated based on one or more reference images of the item 174-2, an embedding 155-3 generated based on one or more reference images of the item 174-3. Items in the confusion set 130 may be selected on any basis, such as a type of the event (e.g., a picking or taking event, or a return or deposit event), proximities of the respective items to one or more hands of the actor 180, viz., the right hand 182-R, or any other basis. Alternatively, where the event is classified as a return or deposit event, the confusion set 130 may include items that the actor 180 is known or believed to possess, or to have previously retrieved from one or more storage units of the materials handling facility 110.

The embeddings 155-1A, 155-1$i$, 155-2, 155-3 may have been generated by one or more statistical models or other machine learning models (e.g., a transformer). Each of the embeddings 155-1A, 155-1B, 155-2, 155-3 may be a representation or a vector representative of one or more reference images of the sandwiches, prepared foods or beverages and implicitly embodied in a set of values and need not be readily interpreted as representing any semantic attributes. The embeddings 155-1A, 155-1B, 155-2, 155-3 may have any length or number of digits or values in accordance with implementations of the present disclosure.

One or more of the items 174-1A, 174-1B, 174-2, 174-3 may be selected based on the embedding 115 and the embeddings 155-1A, 155-1B, 155-2, 155-3. For example, the embedding 115 may be provided in pairs with each of the embeddings 155-1A, 155-1$i$, 155-2, 155-3, e.g., as inputs to a model, an algorithm or a technique that is trained to calculate scores or other outputs representing levels of similarity between the embedding 115 and each of the embeddings 155-1A, 155-1$i$, 155-2, 155-3. In some implementations, a single one of the items 174-1A, 174-1$i$, 174-2, 174-3 may be identified or selected based on a score or another output representing a level of similarity between the embedding 115 and one of the embeddings 155-1A, 155-1$i$, 155-2, 155-3 corresponding to that one of the items 174-1A, 174-1$i$, 174-2, 174-3, such as where the score or the output exceeds a threshold or is a greatest one of the scores or outputs calculated for the items 174-1A, 174-1$i$, 174-2, 174-3 based on the embedding 115 and the embeddings 155-1A, 155-1$i$, 155-2, 155-3. Alternatively, in some implementations, multiple ones of the items 174-1A, 174-1$i$, 174-2, 174-3 may be identified or selected based on scores or other outputs representing levels of similarity between the embedding 115 and the embeddings 155-1A, 155-1B, 155-2, 155-3 corresponding to such items, and one of the items in the confusion set 130 may be selected based on such scores or outputs or on any other basis.

Where a score or an output representing a level of similarity between the embedding 115 and the embedding 155-2 has a greatest value or is identified on any other basis, the item 174-2 may be identified accordingly and associated with the actor 180. For example, a record of items for the actor 180 may be updated to indicate that the actor 180 has retrieved the item 174-2, at the time $t_A$ or the time $t_B$, or at any other time.

Accordingly, the systems and methods of the present disclosure are directed to detecting events based on contents of hands depicted within visual images. Positions of body parts may be determined from the visual images, and portions of the visual images depicting hands may be cropped therefrom. A set of the cropped visual images may be filtered to remove images that do not likely depict an item within a hand, e.g., based on times at which such images were captured, distances of the hand from a location of an event, or a number of items detected within the hand, in order to reduce a number of images or an amount of data to be processed. Once the cropped visual images have been filtered or otherwise reduced in number, the cropped visual images may be processed to generate embeddings, vectors or other sets of data representative of such images and the contents of hands depicted therein. The embeddings, vectors or other sets of data may be compared to corresponding embeddings, vectors or other sets of data generated from reference images of items available in inventory at the materials handling facility. An item within a hand of an actor may be identified based on the comparison of the embeddings, vectors or other sets of data, and an event involving the item may be associated with the actor accordingly.

In accordance with implementations of the present disclosure, images may be captured by any number of cameras or other imaging devices that include any number of fixtures, storage units or other features within their respective fields of view. Each of the cameras may operate one or more machine learning systems to detect and locate body parts or other objects within images, and generate maps, positions or other representations of such body parts in 3D space from such images. Each of the cameras may be further configured to crop or otherwise isolate portions of such images depicting hands.

Furthermore, images captured by cameras may be continuously processed, in order to determine a time at which an actor is detected within a field of view of a camera, or a time at which a hand or another body part has departed from the field of view of the camera. In some implementations, a detection of an actor within images captured by a camera may act as a trigger for the camera to further process the images captured thereby, e.g., to detect hands or other body parts therefrom and filter such cropped visual images on any basis.

In some implementations, one or more processors or processor units provided on cameras or other computer devices or systems may execute machine learning models (algorithms, systems or techniques such as artificial neural networks, e.g., convolutional neural networks) that are trained to receive images captured by the cameras as inputs and to generate one or more outputs associated with tasks relating to the images. Such tasks may include the detection of body parts (e.g., not only hands but also heads, shoulders or others) within images, the identification of portions of images depicting such body parts or the analysis of such portions to determine whether any of such body parts includes an item, or the calculation of distances between body parts and locations of items. Such models may have any number of layers associated with the performance of such tasks, or others.

In some implementations, cameras or other computer devices or systems may be configured to operate machine learning models that are trained to perform multiple tasks based on a single input. For example, in some implementations, a camera may execute a model that performs body part detection, cropping or isolation, object recognition, or other tasks based on each visual images captured thereby. The model may be constructed with a common, shared backbone and with one or more separate decoding layers, task layers, middle layers, or others. In some implementations, a model may be a convolutional neural network having one or more layers dedicated to the performance of each of a plurality of tasks, e.g., in a common architecture.

Those of ordinary skill in the pertinent arts will recognize that imaging data, e.g., visual imaging data, depth imaging data, infrared imaging data, or imaging data of any other type or form, may be captured using one or more imaging devices such as digital cameras, depth sensors, range cameras, infrared cameras or radiographic cameras. Such devices generally operate by capturing light that is scattered or reflected from objects, and by subsequently calculating or assigning one or more quantitative values to aspects of the scattered or reflected light, e.g., image pixels, then generating an output based on such values, and storing such values in one or more data stores. For example, a camera may include one or more image sensors (e.g., a photosensitive surface with a plurality of pixel sensors provided thereon), having one or more filters associated therewith. Such sensors may detect information regarding aspects of any number of image pixels of the scattered or reflected light corresponding to one or more base colors (e.g., red, green or blue), or distances to objects from which the light was scattered or reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network such as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBD or RGBz imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Scattered or reflected light may be captured or detected by an imaging device if the light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is scattered or reflected off objects of any kind to a sufficiently high degree of resolution using one or more sensors thereof, and store information regarding the scattered or reflected light in one or more data files.

Many imaging devices also include manual or automatic features for modifying their respective fields of view or orientations. For example, a camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a camera may virtually stretch or condense the pixels of an image in order to focus or broaden the field of view of the camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures, outlines or other aspects of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more machine learning models (e.g., algorithms, systems or techniques). The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which detecting events involving actors or objects is desired, including but not limited to locating humans and/or machines within a materials handling facility, locating any other objects within a materials handling facility, or detecting events involving the humans or machines and such other objects. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to locate body parts of human operators (e.g., customers, workers or other personnel) and/or component parts of machines (e.g., autonomous mobile robots) and to recognize interactions involving such humans or machines within a materials handling facility, including but not limited to interactions with one or more items (e.g., consumer goods) or other inanimate objects within the materials handling facility. Such systems and methods may also be utilized to locate objects within transportation centers, financial institutions or like structures in which diverse collections of people, objects or machines enter and exit from such environments at regular or irregular times or on predictable or unpredictable schedules. By relying on multiple imaging devices, motion of an object may be located even when the object is occluded in one or more of the fields of view of the imaging devices. Moreover, as used herein, the term "machine learning model" or like terms may include, but is not limited to, any type or form of machine learning algorithm, system, technique, method, operations, or tool, in a physical or a virtual form, and need not be limited to discrete hardware systems provided for such purposes.

Figure 2A:
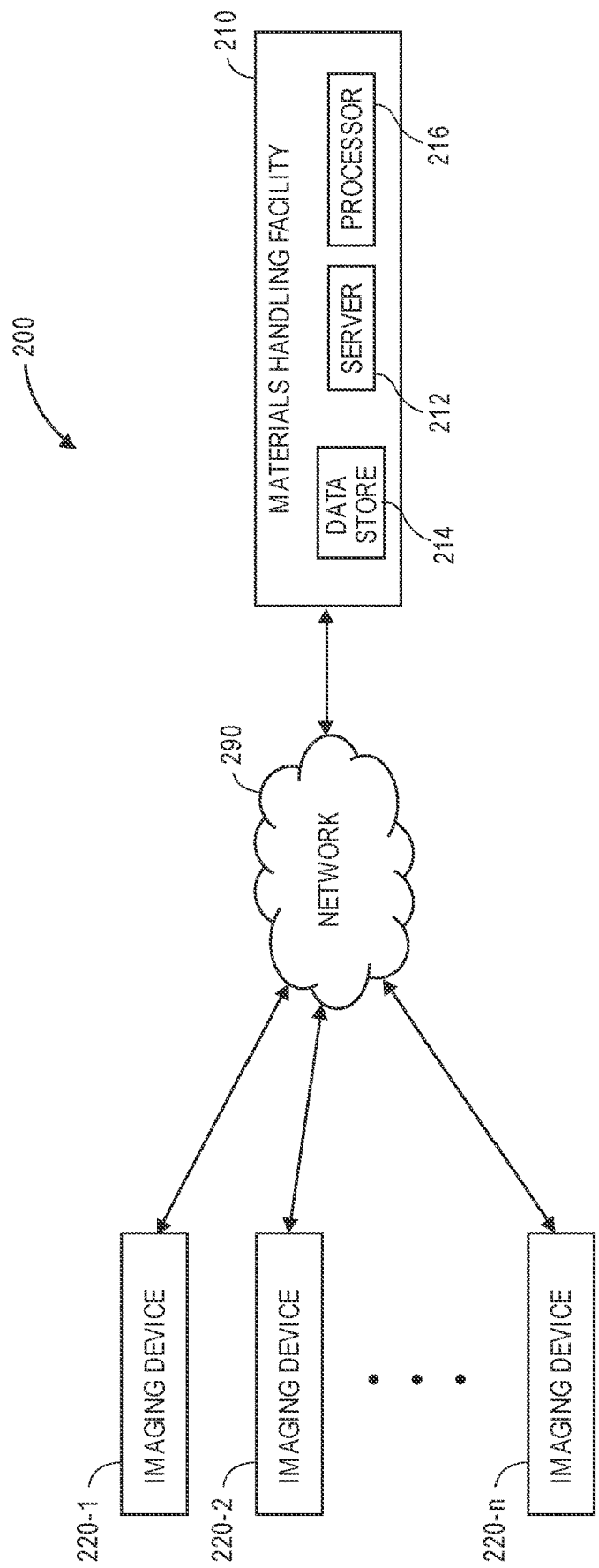
FIGS. 2A and 2B are block diagrams of components of one system for detecting events in accordance with implementations of the present disclosure.
Figure 2B:
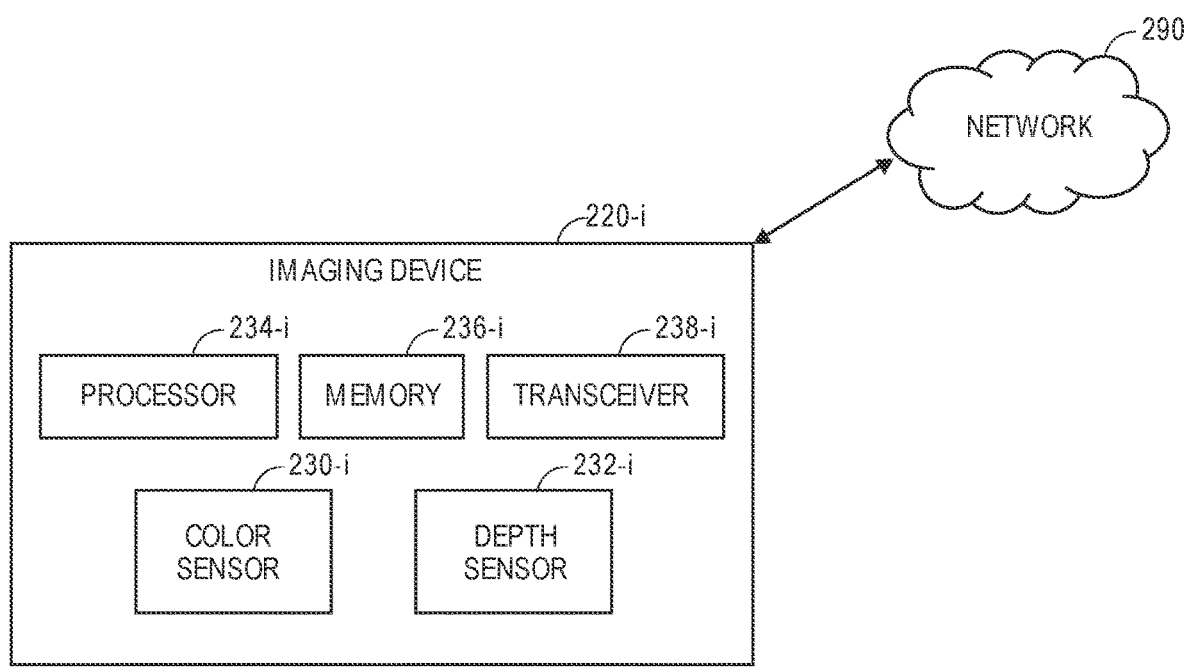

Referring to FIGS. 2A and 2B, a block diagram of components of one system 200 for detecting events in accordance with implementations of the present disclosure is shown.

The system 200 includes a materials handling facility 210 and a plurality of imaging devices 220-1, 220-2 . . . 220-n that are connected to one another across a network 290, which may include the Internet in whole or in part. Except where otherwise noted, reference numerals preceded by the number "2" shown in FIG. 2A or 2B indicate components or features that are similar to components or features having reference numerals preceded by the number "1" shown in FIGS. 1A through 1M.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including such a list) and may pick one or more of the inventory items from an inventory area at the materials handling facility 210. In other implementations, an employee of the materials handling facility 210 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2A, the materials handling facility 210 includes a networked computer infrastructure for performing various computer-related functions associated with the receipt, storage, processing and distribution of such items, including one or more physical computer servers 212, data stores (e.g., databases) 214 and/or processors 216, that may be provided in the same physical location as the materials handling facility 210, or in one or more alternate or virtual locations, e.g., in a "cloud"-based environment. In some implementations, the servers 212, the data stores 214 and/or the processors 216 or any number of other computing devices or resources may further execute any type of computer-based function or compute any type or form of calculation, including but not limited to any formulas, equations, algorithms or techniques for determining one or more probabilities or performing any number of statistical tests.

In some implementations, the servers 212, the data stores 214 and/or the processors 216 may be configured to execute one or more machine learning systems or techniques. For example, in some implementations, the servers 212 may be configured to execute an artificial neural network, such as a convolutional neural network, to process imaging data received from one or more of the imaging devices 220-1, 220-2 . . . 220-n over the network 290.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 210 may include one or more inventory areas having predefined two-dimensional or 3D storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2A or FIG. 2B). The materials handling facility 210 may operate one or more order processing and/or communication systems using computer devices or resources in communication with one or more of the servers 212, the data stores 214 and/or the processors 216, or through one or more other computing devices or resources that may be connected to the network 290, in order to transmit or receive information in the form of digital or analog data, or for any other purpose.

The materials handling facility 210 may be associated with a plurality of imaging devices 220-1, 220-2 . . . 220-n (or other sensors), which may be any form of optical recording device that may be used to photograph or otherwise record imaging data of structures, facilities or items within the materials handling facility 210, or for any other purpose. The imaging devices 220-1, 220-2 . . . 220-n have diverse fields of view of the materials handling facility 210, or other scenes, that are configured to capture imaging data that may be processed to recognize and locate motion, locations and/or orientations of various actors within the materials handling facility 210. The imaging devices 220-1, 220-2 . . . 220-n may be mounted in any specific location or orientation within the materials handling facility 210, e.g., above, below or alongside one or more inventory areas or stations for receiving or distributing items. Alternatively, the imaging devices 220-1, 220-2 . . . 220-n may be provided in any open or enclosed environment or space in which any number of actors (e.g., humans, other animals or machines) may execute one or more poses, gestures or other actions within one or more of their fields of view.

Each of the imaging devices 220-1, 220-2 . . . 220-n shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative one of the imaging devices 220-1, 220-2 . . . 220-n, viz., an imaging device 220-i, includes one or more optical sensors, including color sensors (or grayscale sensors or black-and-white sensors) 230-i and/or depth sensors 232-i configured to capture visual imaging data (e.g., textures) or depth imaging data (e.g., ranges) to objects within one or more fields of view of the imaging device 220-i. The imaging device 220-i further includes one or more processors 234-i, one or more memory components 236-i and one or more transceivers 238-i, and any other components (not shown) that may be required in order to capture, analyze and/or store imaging data from within the materials handling facility 210 environment in which the imaging device 220-i is provided. For example, the imaging device 220-i may capture one or more still or moving images (e.g., streams of visual and/or depth images or image frames), along with any relevant audio signals or other information (e.g., position data), and may also connect to or otherwise communicate with the servers 212, or any other computer devices within the materials handling facility 210 (not shown), or with one or more external computer devices over the network 290, through the sending and receiving of digital data. In some implementations, the transceiver 238-i may be configured to enable the imaging device 220-i to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 212 or over the network 290 directly.

The processors 234-i may be configured to execute an artificial neural network, such as a convolutional neural network, to process imaging data captured by one or more of the color sensors 230-i or the depth sensors 232-i. For example, the artificial neural networks executed by the processors 234-i may perform tasks in one or more core areas, including but not limited to person detection, feature extraction, person linking and unlinking. In some implementations, one such neural network may be a neural network backbone (e.g., a residual neural network backbone) that is configured to perform one or more tasks for locating actors based on images captured by the imaging device 220-i, including but not limited to one or more of person detection (e.g., head detection), person bounding box generation, instance segmentation, and person locating in 3D space based on visual images (e.g., RGB images). The processors 234-i may be configured to execute multi-task networks having shared backbones and one or more decoding layers.

For example, in some implementations, the processors 234-i may operate an artificial neural network or other classifier that receives an image (e.g., a visual image, or an RGB image) as an input, and processes the image for one or more person detection (e.g., head detection, bounding box generation, instance segmentation, and line segment estimation) for any number of actors depicted within the image. Based on such detections, visual descriptors of pixels depicting the actors, including but not limited to appearance features of such actors, e.g., sets of information or data identifying colors, textures, shapes or other aspects of features of such actors, may be determined. The processors 234-i may also define a trajectory or "tracklet," e.g., a record of the positions of an actor at various times beginning at an initial detection and following with subsequent detections. Trajectories or tracklets and visual descriptors generated by the processors 234-i may be used to link detections of actors in consecutively captured frames to one another, or to reidentify a previously detected actor if the actor is not detected for a brief period of time.

In some implementations, the processors 234-i may predict a 3D location of an actor by detecting a head within an image and determining or estimating a height of the actor, or a line segment extending between the detected head of the actor and a corresponding location of a floor or other ground surface, within the image (e.g., a 2D line segment), which is aligned along a line extending from the detected head of the actor to a vertical vanishing point to which all vertical lines shown within the image converge. A line segment determined for an actor may be used to determine a 3D position of the actor based on intrinsic properties of the camera and a pose of the actor. The length of the line segment may be predicted upon a detection of a head within the image. In some implementations, the processors 234-$i$ may predict a length of the line segment corresponding to an actor based on an output received from an artificial neural network that also detected a head of the actor, and utilize the line segment to determine a 3D location of the actor.

In some implementations, the processors 234-$i$ may execute one or more tracking or matching algorithms, e.g., a tracking-by-detection algorithm, or a bipartite matching algorithm, that generates a tracklet-to-detection assignment or a visual descriptors-to-detection assignment over consecutive frames given an edge cost matrix. If a trajectory or tracklet, or visual descriptors of a set of pixels, are not matched to a head detection, the processors 234-$i$ may execute one or more optical flow algorithms on successive frames to extend a trajectory or tracklet location into a successively captured frame. Additionally, a confidence classifier may generate a confidence score in a given assignment. Moreover, the processors 234-$i$ may change a manner or technique by which a given actor is located from frame to frame. For example, processors 234-$i$ may locate actors based on body part detections (e.g., head detections) when such body parts are visible within an image frame, or may alternatively switch to locating via a set of visual descriptors of pixels corresponding to an actor (e.g., a bounding box or instance segmentation), to the extent that the visual descriptors of pixels are consistent from image frame to image frame.

In some implementations, nodes corresponding to body parts detected by the imaging devices 220-1, 220-2 . . . 220-$n$ may be represented in space by a set of Cartesian coordinates, or coordinates according to any other system, and an articulated model in the form of a record or vector may include one or more of such sets of coordinates. In some implementations, edges extending between a pair of nodes may be established by reference to each of the nodes of the pair, as well as a linear formula, a linear equation or other representation of points extending between the respective nodes of the pair, and an articulated model in the form of a record or a vector may identify edges by reference to their respective nodes, or include one or more of such formulas, equations or other representations for such edges. For example, detections of body parts may be matched across multiple views in two-dimensional images and converted to 3D rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding to such detections, thereby enabling a body part to be detected and re-detected in the multiple views even if the body part is temporarily occluded in one of the views. The trajectories may be models of smoothed three-dimensional tracks that best fit a plurality of two-dimensional observations of a body part within multiple images. In some implementations, trajectories may be defined by minimizing differences between ray projections extending from optical elements of imaging devices to pixels depicting specific body parts detected within images captured by such imaging devices and splines or other curves defined from such frames, e.g., according to a least squares problem. Any method or technique for defining a 3D track or trajectory of a body part or an actor from two-dimensional observations of the body part or the actor in images may be utilized in accordance with the present disclosure.

Moreover, in some implementations, the processors 234-$i$ may combine trajectories or tracklets when corresponding positions are sufficiently proximate to one another and one of the trajectories or tracklets has a sufficiently low level of confidence., or on any other basis.

The imaging devices 220-1, 220-2 . . . 220-$n$ may be homogenous or heterogeneous in nature, in accordance with the present disclosure. For example, one or more of the imaging devices 220-1, 220-2 . . . 220-$n$ may have both the color sensor 230-$i$ and the depth sensor 232-$i$. Alternatively, one or more of the imaging devices 220-1, 220-2 . . . 220-$n$ may have just a color sensor 230-$i$ (or grayscale sensor or black-and-white sensor) or just a depth sensor 232-$i$. For example, in some implementations, one or more of the imaging devices 220-1, 220-2 . . . 220-$n$ may be configured to capture depth imaging data, e.g., distances or ranges to objects within their respective fields of view. In some implementations, one or more of the imaging devices 220-1, 220-2 . . . 220-$n$ may be configured to capture visual imaging data, e.g., visual images or images in color, grayscale or black-and-white.

For example, one or more of the imaging devices 220-1, 220-2 . . . 220-$n$ may be an RGB color camera, a still camera, a motion capture/video camera or any other type or form of camera. In other implementations, one or more of the imaging devices 220-1, 220-2 . . . 220-$n$ may be depth-sensing cameras, such as an RGBz or RGBD camera. In still other implementations, one or more of the imaging devices 220-1, 220-2 . . . 220-$n$ may be a thermographic or infrared (IR) camera. Additionally, in some implementations, the imaging devices 220-1, 220-2 . . . 220-$n$ may simply be camera modules that include a lens and an image sensor configured to convert an optical image obtained using the lens of the camera into a digital signal or digital representation of the image (generally referred to herein as imaging data). In one implementation, the image sensor may be an RGB sensor capable of supporting an image resolution of at least 860×480 in an image, and capturing images at a frame rate of at least six frames per second, that may likewise be configured to provide image data to other components (e.g., a graphics processing unit) for processing. In some implementations, the imaging devices 220-1, 220-2 . . . 220-$n$ may be paired to provide stereo imagery and depth information, and may include a pair of camera modules. Additionally, imaging data may be stored in any variety of formats, including but not limited to YUYV, RGB, RAW, .bmp, .jpeg, .gif, or the like.

The imaging devices 220-1, 220-2 . . . 220-$n$ may also include manual or automatic features for modifying their respective fields of view or orientations. For example, one or more of the imaging devices 220-1, 220-2 . . . 220-$n$ may be configured in a fixed position, or with a fixed focal length (e.g., fixed-focus lenses) or angular orientation. Alternatively, one or more of the imaging devices 220-1, 220-2 . . . 220-$n$ may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 220-1, 220-2 . . . 220-$n$, or changes in one or more of the angles defining the angular orientation.

For example, one or more of the imaging devices 220-1, 220-2 . . . 220-*n* may be hard-mounted to a support or mounting that maintains the device in a fixed configuration or angle with respect to one, two or three axes. Alternatively, however, one or more of the imaging devices 220-1, 220-2 . . . 220-*n* may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device. In some implementations, two or more of the imaging devices 220-1, 220-2 . . . 220-*n* may be provided within a common housing, e.g., a dual camera module housing.

Some of the imaging devices 220-1, 220-2 . . . 220-*n* may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of the imaging devices 220-1, 220-2 . . . 220-*n*, e.g., digital cameras, may be affected based on the lighting conditions and characteristics of the scenes in which the imaging devices 220-1, 220-2 . . . 220-*n* are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the system 200 of FIG. 2A includes boxes corresponding to three imaging devices 220-1, 220-2 . . . 220-*n*, those of ordinary skill in the pertinent arts will recognize that any number or type of imaging devices may be provided within the materials handling facility 210 in accordance with the present disclosure, including but not limited to digital cameras, depth sensors or range cameras, infrared cameras, radiographic cameras or other devices having one or more optical sensors. In some implementations, the system 200 (e.g., the materials handling facility 210) may include dozens or even hundreds of imaging devices of any type or form. Moreover, the system 200 (e.g., the materials handling facility 210) may also include any other type of sensing systems for detecting actors and recognizing their motion, locations and/or orientations within the materials handling facility 210. Such sensors may include, but are not limited to, one or more load or weight sensors provided on walking or traveling surfaces within the materials handling facility 210, one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. The type or form of sensors that may gather information or data regarding actors and their motion, locations and/or orientations at the materials handling facility 210 are not limited.

The materials handling facility 210 may also include any number of other sensors, components or other features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the servers 212, with one or more of the imaging devices 220-1, 220-2 . . . 220-*n*, or with one or more computer devices or resources, such as the servers 212, over the network 290, as well as a display (e.g., a touchscreen display) to facilitate the visible presentation to and interaction with a human operator.

The servers 212 or any other computer devices associated with the materials handling facility 210 or connected to the network 290 may execute one or more multi-camera tracking algorithms or techniques. For example, in some implementations, the imaging devices 220-1, 220-2 . . . 220-*n* may provide their respectively determined trajectories or tracklets of actors and visual descriptors of pixels of images (e.g., appearance features, motion properties and geometry) depicting the actors to the server 212. Additionally, the server 212 may map single-camera trajectories or tracklets to positions in 3D space based on their respective predicted 3D line segments and their corresponding appearance features, motion properties and geometry in 3D space for the respective trajectories or tracklets. The server 212 may then correlate or merge trajectories or tracklets received from multiple ones of the imaging devices 220-1, 220-2 . . . 220-*n* into multi-camera trajectories or tracklets, and assign identifiers to the respectively correlated or merged trajectories or tracklets.

The servers 212 may further associate any multi-camera trajectories or tracklets with identifiers of actors within the materials handling facility 210 in any manner. For example, a unique identifier may be assigned to each multi-camera trajectory or tracklet, e.g., and such multi-camera trajectories or tracklets may be tracked based on single-camera trajectories or tracklets, and visual descriptors, received from the respective imaging devices 220-1, 220-2 . . . 220-*n*.

In some implementations, the system 200 may further include one or more event generator systems comprising sensors that are provided in one or more select locations within the materials handling facility 210. Each of such sensors may be configured to detect information or data from which a location at which an event has occurred, or a time (or duration) of the event, e.g., an interval of time that includes the time of the event. In some implementations, an item associated with an event may be identified based on the location and/or the time (or duration) of the event based on planogram data, which may indicate the placement of one or more items in inventory areas or storage units within the materials handling facility 210.

For example, one or more of such sensors may be an imaging device configured to capture imaging data regarding an inventory area and/or storage unit, e.g., one or more of the imaging devices 220-1, 220-2 . . . 220-*n*, and whether an event has occurred, and a time of such an event, may be determined based on such imaging data. One or more of such sensors may include load or weight sensors provided in association with an inventory area or storage unit, and whether an event has occurred, and a time of such an event, may be determined based on load signals received from such load or weight sensors or, alternatively, changes in load signals indicating increases or decreases in loading applied to the inventory area or storage unit. An item associated with such an event may be determined based on one or more magnitudes of such changes. For example, when an actor is determined to have accessed an inventory area or shelving unit to retrieve an item therefrom at a specific location, and a number of items are located within a vicinity of the specific location, a change in the mass of all of the items present on the shelf may be determined, and one of the items within the vicinity of the specific location having a mass consistent with the determined change in the mass of all of the items present on the shelf may be presumed to have been retrieved by the actor.

Alternatively, one or more of such sensors may include RFID components (e.g., antennas or tags) for transmitting and/or receiving RFID signals associated with items or inventory areas and/or storage units, and whether an event has occurred, and a time of such an event, may be determined based on the receipt of such signals, or the loss of such signals. An item associated with such an event may be determined based on the respective RFID signals that are transmitted or received, or are no longer received. As another alternative, one or more of such sensors may include one or more LIDAR components for transmitting and/or receiving one or more light signals in association with inventory areas and/or storage units, and whether an event has occurred, and a time of such an event, may be determined based on the light signals that are transmitted or received.

The type or form of such sensors provided in association with an event generator system are not limited. Moreover, one of the sensors may be in communication with a central processor or server of an event generator system that may receive information or data from such sensors, and provide such information or data (e.g., digital and/or analog data) to one or more other computing devices or resources that may be connected to the network 290, or for any other purpose. Alternatively, one or more of such sensors may be outfitted with processors and/or transceivers for independently transmitting or receiving information or data (e.g., digital and/or analog data) to or from one or more other computing devices or resources that may be connected to the network 290, or for any other purpose.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," a "camera," a "system," an "actor" (or "customer," or "user," or "worker," or "human operator") or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," a "camera," a "system," an "actor" (or "customer," or "user," or "worker," or "human operator") may be typically performed by a human, but could, alternatively, be performed by an automated agent.

The materials handling facility 210 (or any actors associated therewith) and/or the imaging devices 220-1, 220-2 . . . 220-*n* may use any web-enabled or Internet applications or features, any other client-server applications or features, or other messaging techniques, to connect to the network 290 or to communicate with one another. For example, the servers 212 may be adapted to transmit or receive information or data in the form of synchronous or asynchronous messages to or from the imaging devices 220-1, 220-2 . . . 220-*n*, or any other computer device (e.g., any device having any number of other servers, data stores, processors or the like) in real time or in near-real time, or in one or more offline processes, via the network 290. Those of ordinary skill in the pertinent art would recognize that the materials handling facility 210 (or any actors associated therewith) or the imaging devices 220-1, 220-2 . . . 220-*n* may include or operate any of a number of computing devices or resources that are capable of communicating over the network 290, including but not limited to set-top boxes, personal digital assistants, digital media players, mobile devices (e.g., smartphones), tablet computers, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a transitory and/or non-transitory computer-readable medium that is within or accessible by computers or computer components such as the servers 212, the data stores 214, the processor 216, the imaging devices 220-1, 220-2 ... 220-n, the processor 234-i, or any other computers or control systems having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 3A:
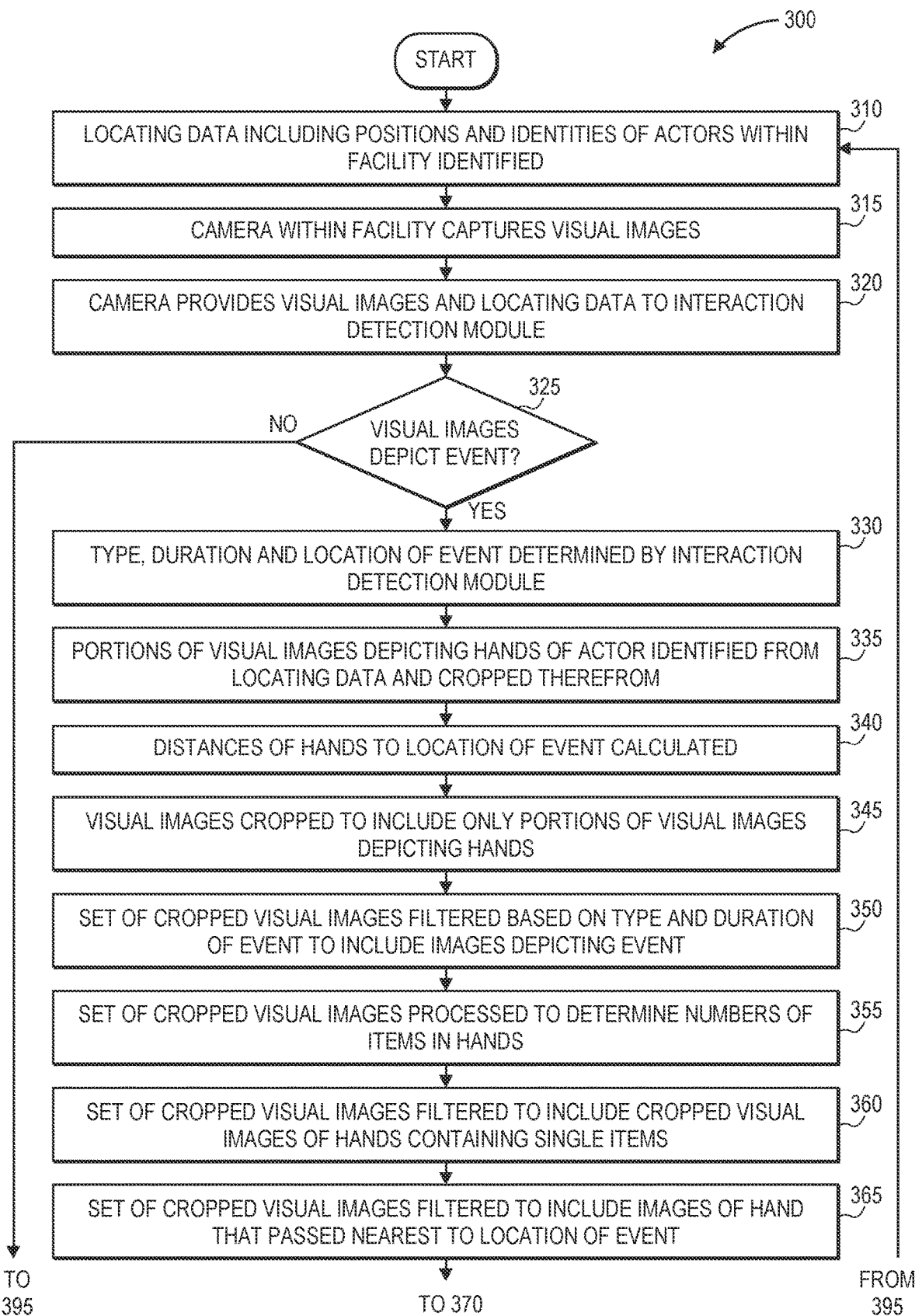
FIGS. 3A and 3B are a flow chart of one process for detecting events in accordance with implementations of the present disclosure.
Figure 3B:
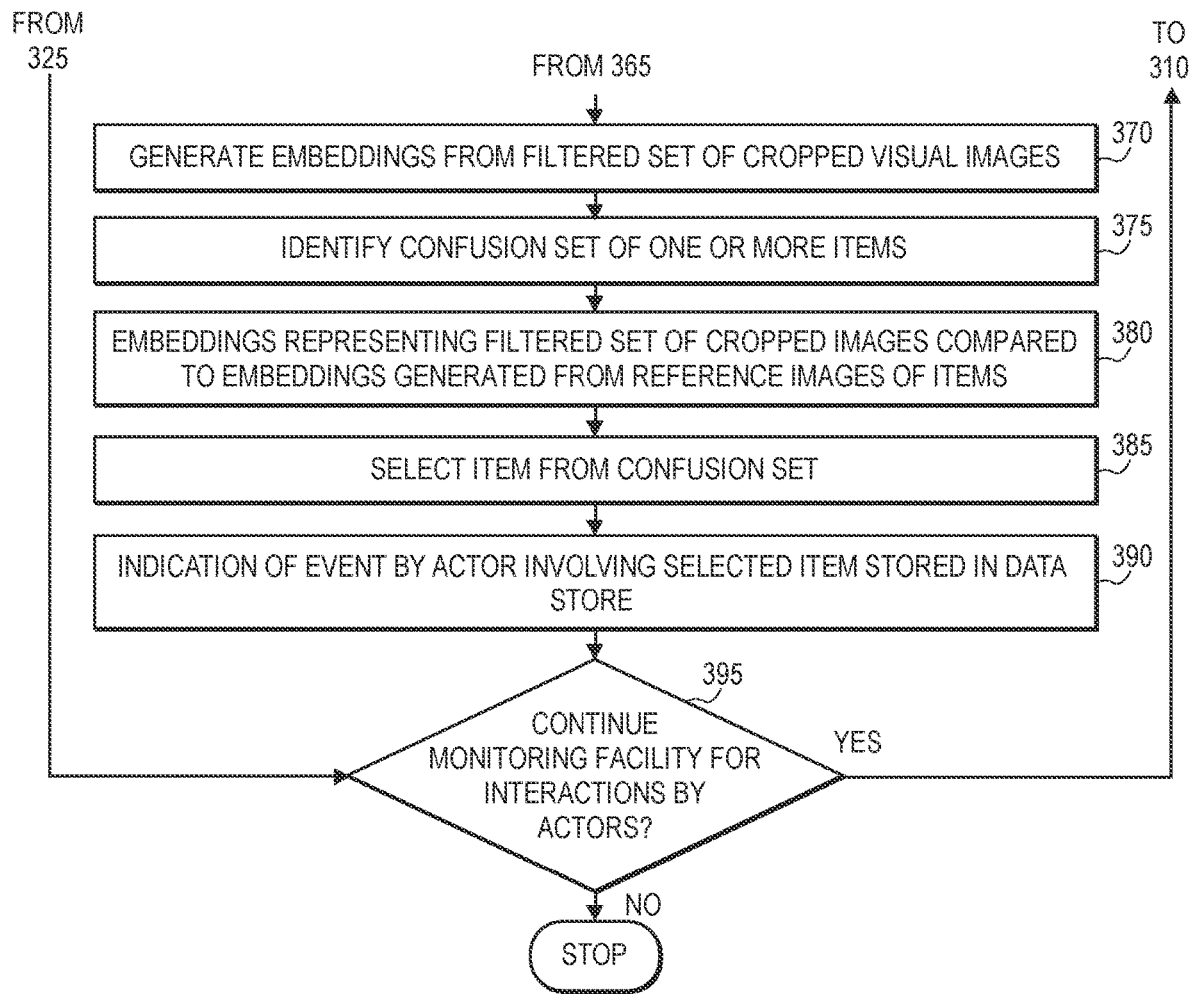

Referring to FIGS. 3A and 3B, a flow chart 300 of one process for detecting events in accordance with implementations of the present disclosure is shown.

At box 310, locating data regarding positions and identities of actors within a materials handling facility is identified. For example, the materials handling facility may include a plurality of physical structures or fixtures for storing one or more items, or sets of items, thereon or therein, and such structures or fixtures may include any number of storage units, e.g., sets or racks of shelves or platforms having items of various types or kinds provided in specific locations thereon, such as one or more lanes or other portions or sections of such shelves or other platforms. The structures or fixtures may be provided in discrete locations of the materials handling facility, such as along or adjacent to one or more walls, or independently within or near walking or traveling areas or spaces of the materials handling facility, such as on a table or another structure, or in a free-standing manner.

Actors that are present at the materials handling facility may be detected and identified in any manner, such as, for example, by a locating service or other system having one or more processors and one or more sensors for detecting the presence or absence of actors, and locating one or more poses, gestures or other actions executed by such actors. Processors of the locating system may be provided at the materials handling facility, or in one or more alternate or virtual locations, e.g., in a "cloud"-based environment. Alternatively, the actors may be identified upon entering the materials handling facility, e.g., by bearing or presenting a virtual credential or a physical credential, such as a sheet of paper, a mobile device having a display bearing a bar code (e.g., a one-dimensional or two-dimensional bar code, such as a QR bar code) or other symbol or marking, or one or more body parts of the actor, and the actor may scan the object or otherwise enable the bar code, symbol or marking, or the one or more body parts, to be read or interpreted at an entrance to the materials handling facility, or at another location associated with the materials handling facility. A set of visual descriptors of pixels corresponding to an actor may be determined from images captured as the actor entered the materials handling facility, e.g., upon scanning or interpreting the bar code, symbol or marking.

The locating data (or tracking data) may be determined by or received from a tracking system or service operating within the materials handling facility, and may include approximate positions of any number of actors, as well as visual descriptors or other identifiers of such actors, or any other information or data regarding the actors. In some implementations, the tracking system or service may execute one or more tracking or matching algorithms, e.g., a tracking-by-detection algorithm, or a bipartite matching algorithm, that generates a tracklet-to-detection assignment or a visual descriptors-to-detection assignment over consecutively captured data (e.g., consecutive visual images) in any manner. For example, if a trajectory or visual descriptors of a set of pixels identified in one image frame are not matched to a detection of a body part (e.g., a head) within the image frame, the trajectory or visual descriptors may be extended into a successively captured frame. In some implementations, the locating data may relate to a detection of a body part in one image frame, and a set of visual descriptors of pixels corresponding to the actor in a subsequent image frame. Moreover, in some implementations, the locating data may further include or reference images of one or more portions of each of such actors (e.g., images of body parts such as heads), as well as approximate positions of such portions of the actors, which may have been captured by one or more imaging devices or other sensors provided within the materials handling facility or from any other source. The locating data may also identify approximate positions of each of the actors, which may be represented in 3D space by a set of Cartesian coordinates, or coordinates according to any other system.

In some implementations, data representing positions of each of the storage units may be identified or represented in data in any manner, and with any level of granularity or specificity. For example, positions of one or more of the storage units may be represented in 3D space by a set of Cartesian coordinates, or coordinates according to any other system, e.g., a local coordinate system unique to the materials handling facility.

At box 315, a camera within the facility captures visual images. For example, the camera may be mounted to one or more systems or structures within the materials handling facility, e.g., a ceiling, a wall, a fixture, or any other systems or structures. The camera may include a field of view that is aligned to enable the capture of imaging data depicting portions of structures or features including any number of storage units, as well as imaging data regarding movements of one or more actors, machines, items or any other objects within a vicinity of such structures or features.

The camera may be configured to capture visual images at any frame rate. In some implementations, the camera may be configured to capture visual images at fifteen frames (or images) per second. Alternatively, the camera may be configured to capture visual images at frame rates of five, ten, twenty, thirty, sixty or any other number of frames (or images) per second. Additionally, the camera may also be configured to capture visual images at any level of resolution or pixel density. For example, in some implementations, the camera may be configured to capture high resolution images, such as images having resolutions or pixel densities of at least 300 pixels per inch (or ppi), or any other number of pixels per inch. Moreover, in some implementations, the camera may be configured to capture images of any size or dimensions.

In some implementations, the camera may be one of the sensors by which some or all of the locating data regarding the positions of the actors within the materials handling facility identified at box 310 was captured. In some other implementations, however, the camera need not be one of the sensors by which any of the locating data was captured.

At box 320, the visual images and the locating data are provided to an interaction detection module or another application or component provided on the camera that is configured to determine whether such visual images depict any number of interactions (or events). For example, in some implementations, the images may be provided to a machine learning system (e.g., a convolutional neural network, a deep learning neural network, or other system or technique) having one or more output layers for calculating regressions between pixels depicting body parts and pixels depicting locations such as item spaces, or lanes, within such images. In some implementations, one or more processor units provided on the camera may generate regression vectors associating one or more of the body parts with locations on the storage unit where an event may have occurred, and calculate confidence scores in such regression vectors. The regressions may take the form of a coordinate pair, e.g., an (x, y) pair identifying a pixel depicting a body part of an actor within an image plane of the image, and confidence scores may range between zero and one, or have any other value.

In some implementations, an interaction detection module may generate records of interactions with storage units or other locations of items by actors, including identifiers of the actors, start and end times of the interactions, trajectories of hands of the actors during the interactions, and potential locations of the events. The records of the interactions may identify the respective actors determined to have participated in or performed the interactions, and classify the interactions, e.g., as a picking or taking event (or a retrieval) by an actor, a return or deposit event (or a placement) by the actor, no events (e.g., neither pickings or takings nor returns or deposits, or any retrievals or placements) by the actor, or a multiple event (e.g., one or more pickings or takings and also one or more returns or deposits, or one or more retrievals and one or more placements) by the actor. A record of an interaction may also include a confidence score associated with a classification of the interaction, e.g., that an interaction is a picking or taking event, a return or deposit event, not an event, or a multiple event.

Records of interactions may be a time series or other set of data in a file (e.g., a spreadsheet) or record that includes values of data determined from images captured by the cameras, and times (e.g., time stamps) at which each of such images was captured. For example, a record of an interaction may be a matrix or an array, e.g., a sparse matrix or a sparse array, having at least two dimensions, including a dimension (e.g., a row or a column) corresponding to time stamps of each of the images, and a dimension (e.g., a column or a row) corresponding to variables for each of any number of features, such as body part locations, distances from locations of such body parts to locations of products, or other features, at each of the times of such time stamps.

In some embodiments, values of features at times may be included in cells of a time series defined by intersections of variables for those features and time stamps at those times. For example, where a feature includes a location of a body part depicted within images captured by a camera, e.g., within an image plane of the camera, data regarding the feature over a period of time may represent a single-view trajectory of the body part over the period of time. Where a feature is not detected at a given time (e.g., where a body part or other detection is not available at that time, due to an obstruction or a departure of the body part from a field of view), a value of the feature in the cell defined by the intersection of the variable and the time stamp at that time is zero, or may be left blank or empty.

At box 325, whether the visual images depict an event is determined. For example, in some implementations, where the interaction detection module determines that a confidence score in a regression vector between a location of a body part of an actor depicted within one or more visual images and a location on a storage unit depicted within the visual images exceeds a predetermined threshold, the visual images may be deemed to potentially depict an event. Alternatively, the interaction detection module may determine whether a visual image depicts an event in any other manner.

If the interaction detection module determines that the visual images do not depict an event, then the process advances to box 395, where whether the continued monitoring of the facility for interactions by actors is desired. If the continued monitoring of the facility for interactions is no longer desired, then the process ends. If the continued monitoring of the facility for interactions by actors is desired, however, then the process returns to box 310, where updated locating data regarding positions and identities of actors within the materials handling facility is identified and to box 315, where the camera within the facility continues to capture additional visual images.

If the interaction detection module determines that the visual images depict an event, then the process advances to box 330, where a type, a duration and a location of the event are determined by the interaction detection module. For example, and as is discussed above, records of interactions with storage units or other locations of items by actors generated by the interaction detection module may identify the respective actors, as well as whether each of such interactions is a picking or taking event (or a retrieval) by an actor, a return or deposit event (or a placement) by the actor, no events (e.g., neither pickings or takings nor returns or deposits, or any retrievals or placements) by the actor, or a multiple event (e.g., one or more pickings or takings and also one or more returns or deposits, or one or more retrievals and one or more placements) by the actor.

The duration of the event, or a time associated with the event, may be determined based on time stamps of the visual images depicting the event. The duration of the event may alternatively include an additional buffer of time before a start of the event or after an end of the event, as determined from the visual images by the interaction detection module or otherwise.

The location of the event may be identified as a location of a two-dimensional image plane of the camera (or a location within an image captured by the camera), a position in 3D space, or in any other manner. For example, the location of the event may be determined with respect to locations or positions of storage units or other aspects of structures or fixtures depicted within the visual images, with respect to data identifying locations or positions of such storage units, or in any other manner.

At box 335, portions of the visual images depicting hands are identified based on the locating data and cropped therefrom. For example, in some implementations, the camera may execute a body part detection module (e.g., an algorithm, system or technique), which may be an artificial neural network, such as a convolutional neural network, or any other machine learning model that is trained to identify body parts such as not only hands but also heads, arms, torsos or portions thereof within imaging data. In some implementations, the body part detection module may generate, as an output in response to each image received as an input, a segmentation record identifying such segments of that image depicting body parts and their respective locations within the image. In some implementations, the body part detection module may be configured to detect portions of a body part, including but not limited to multiple portions of the same body part, e.g., an upper arm and a lower arm, a thumb and a palm, or the like.

In some implementations, where a hand is one of the body parts detected within visual images captured at box 320, one or more processor units provided on or within the camera may generate or identify a bounding box or another portion of the visual image representing sets of pixels depicting the hand, or otherwise provide a point of reference for a location of the hand within the visual image, and crop portions around or about such points. The cropped portions of the visual images depicting hands may include a predetermined number of image pixels, or a variable number of image pixels, and may be identified by a bounding box or in any other manner. Moreover, the cropped portions of the visual images may be stored in association with times at which the respective visual images were captured, e.g., with the same time stamps as the respective visual images, or in any other manner. A location of a hand within a two-dimensional image plane or image may be determined with respect to such pixels. Alternatively, or additionally, a position of a hand within 3D space may be determined based on the location of the hand within images captured by one or more cameras, e.g., based on positions of the cameras, as well as any monocular cues or other attributes of the visual images or the hands depicted therein, or by triangulating detections of the hands within such visual images.

At box 340, distances of the hands to the location of the event determined at box 330 are calculated. For example, where the location of the event is identified as a location within a two-dimensional image plane of the camera, distances to the hands may be calculated with respect to locations of the hands and the location of the event depicted within one or more of the visual images. Where the location of the event is identified as a position in 3D space, positions of the hands in 3D space may be determined, e.g., based on a position of the camera, as well as any monocular cues or other attributes of the visual images or the hands depicted therein, and compared to the position of the location of the event (e.g., a storage unit) in 3D space. For example, the positions of the hands in 3D space may be determined based on absolute or relative sizes of the body parts depicted within the visual images, or apparent elevations of the body parts within the visual images, e.g., with respect to floors or traveling surfaces, as well as any colors or textures of the body parts (or gradients of such colors or textures), relative motion of the body parts, or any other attributes of the body parts or the visual images.

In some implementations, maps of hands or other body parts of actors may be generated, and positions of hands or other body parts may be determined by different processes, e.g., according to two or more discrete algorithms, systems or techniques. Alternatively, in some implementations, maps of hands or other body parts may be generated concurrently or together with the determination of the positions of such body parts in 3D space, e.g., by the same algorithms, systems or techniques.

At box 350, a set of cropped visual images is filtered based on the type and duration of the event to include only cropped visual images depicting the event. For example, where an event is identified with respect to a time or duration, e.g., a start time of the event or an end time of the event, and classified as a picking or taking event (or a retrieval) by an actor, cropped visual images captured at the time of the event or during the duration of the event and thereafter may be filtered from the set of cropped visual images, as visual images captured at the same time as a picking or taking event or thereafter are likely to depict one or more items within a hand of an actor. Conversely, where an event is identified with respect to a time or duration, and classified as a return or deposit event (or a placement) by the actor, cropped visual images captured at the time of the event or during the duration of the event and earlier may be filtered from the set of cropped visual images, as visual images captured prior to or at the same time as a picking or taking event are likely to depict one or more items within a hand of an actor.

At box 355, the set of cropped visual images, as filtered at box 350, is processed to determine numbers of the items within each of the hands. For example, the cropped visual images may be processed to determine whether such images do not depict any items within hands, whether such images depict one item within hands, or whether such items depict multiple within hands. A hand of an actor may be empty, e.g., not contain any items therein, or may include one or more items therein.

At box 360, the set of cropped visual images, as filtered at box 350, is further filtered to include only cropped visual images of hands including only a single item therein. For example, cropped visual images that are determined to depict no items therein may be excluded from consideration and filtered from the set, as such cropped visual images cannot be processed to identify any items depicted therein. Likewise, cropped visual images that are determined to depict multiple items therein may be excluded from consideration and filtered from the set, and processed in another manner, such as by a human operator or by another technique, as such cropped images may be unlikely to depict enough of an individual item within such hands to identify the individual item.

At box 365, the set of cropped visual images, as filtered at box 350, or as further filtered at box 360, is further filtered to include only cropped visual images of a hand of the actor that passed closest to the location of the event determined at box 330. For example, based on positions of the hands of the actor, or distances of such hands from the location of the event determined at box 340, one of the hands of the actor that passes closest to the location of the event may be identified as a hand that had a smallest minimum distance to the location of the event.

In some implementations, where two hands of an actor are depicted within a set of cropped visual images, the cropped visual images that depict a hand that is farthest from the location of the event may be excluded from consideration and filtered from the set, as an actor involved in an event is most likely to use a hand that was nearest the location of the event. Cropped visual images that depict the hand that is farthest from a location of an event are unlikely to depict an item that was involved in the event, regardless of the type of the event.

Alternatively, or additionally, in some implementations, where a cropped visual image depicts a hand of an actor that is beyond a threshold distance from the location of the event, e.g., beyond a distance by which the hand might have been involved in the event, the cropped visual image may be excluded from consideration and filtered from the set.

In some implementations, a set of visual images may be filtered prior to cropping the visual images. For example, the set of visual images may be filtered based on a type and duration of an event, prior to cropping portions of such visual images that depict hands, and subsequently filtered to exclude cropped visual images that depict multiple items within hands, or filtered to exclude cropped visual images of hands that are beyond a threshold distance from a location of an event or are farther than other hands of the same actors from the location of the event. Moreover, a set of visual images may be subject to filtering in any order or sequence. For example, in some implementations, visual images may be filtered for time, duration and location first, before subsequently filtering the visual images based on numbers of items depicted within hands, or filtering the visual images to include only images depicting a hand that passed closest to the location of the event. Alternatively, visual images may be filtered to include only images depicting a hand that passed closest to the location of the event, or to include only images depicting single items within hands, before subsequently filtering the visual images for time, duration and location.

At box 370, embeddings are generated for each of the cropped visual images of the set, as filtered at box 350, 360 or 365. The embeddings (or vectors) may be representative of each of the cropped visual images and may be generated based on the cropped visual images alone, or based on the cropped visual images along with any additional information, data or metadata regarding each of the images, such as an identifier of the actor or a hand (e.g., left or right), a time stamp, a type of an event (e.g., a picking or taking event, or a return or deposit event), or any other information or data. In some implementations, features may be extracted from the cropped visual images, e.g., by an encoder, a convolutional neural network, a transformer, or another machine learning model, and processed to generate the embeddings.

In some implementations, prior to processing a cropped visual image to generate an embedding, the cropped visual image may be processed or pre-processed for any reason. For example, a cropped visual image may be processed according to one or more computer vision techniques to determine whether the image includes a sufficient amount of detail regarding a hand or an item to identify the item. In some implementations, a cropped visual image may be provided to a machine learning model that is trained to detect portions of the cropped visual image corresponding to a hand or an item, or to predict locations of the hand or the item, within the cropped visual image. In some other implementations, a cropped visual image may be segmented or masked, such as to identify segments of the image depicting a hand, or to identify segments of the image depicting an item.

In some implementations, where multiple cropped visual images are available for a single item, embeddings or other representations of each of the cropped visual images may be generated, and an embedding representing a mean or a centroid may be calculated for the item based on the embeddings or other representations.

At box 375, a confusion set of one or more items is identified. The confusion set may include items that are selected on any basis, and may include any type of object that is known or believed to be possibly found within a hand of an actor within the materials handling facility. In some implementations, the confusion set may include all items that are available for purchase at the materials handling facility, regardless of location or number. Alternatively, the confusion set may include a subset of such items that may be selected for any reason and on any basis. For example, where the event determined at box 330 is a picking or taking event, the confusion set may include items that are typically located within a vicinity of the location of the event determined at box 330. Where the event determined at box 330 is a return or deposit event, the confusion set may include items that the actor is known or believed to possess, or to have already retrieved from one or more locations in the materials handling facility. Alternatively, or additionally, the confusion set may include personal items that might be carried by customers, associates or other personnel present within the materials handling facility, such as mobile devices, keys, hats, tools or the like, which need not be available for purchase from the materials handling facility, in order to broaden a scope of items that might potentially be identified within hands of actors.

At box 380, embeddings representing the filtered set of cropped visual images generated at box 370 are compared to embeddings generated from reference images of items in the confusion set. In some implementations, the embeddings may be compared using any type or form of statistical model or another machine learning model, e.g., a contrastive learning model, that is trained to generate a representation or comparison of visual images based on embeddings generated therefrom. For example, in some implementations, the embeddings may be compared using one or more artificial neural networks, each having an input layer, any number of hidden layers (e.g., intervening layers) and an output layer.

In some other implementations, the embeddings may be compared using any number of transformers having one or more attention mechanisms, e.g., a bidirectional encoder representations from transformer (or "BERT"); a deep learning system; a nearest neighbor method or analysis; a factorization method or analysis; a generative model; a gradient boosted decision tree; a K-means clustering analysis; a Random Forest algorithm; a support vector machine; a similarity measure, or others.

Moreover, in some implementations, one or more of the reference images from which embeddings are generated may depict the item within a hand of an actor. Alternatively, or additionally, one or more of the reference images of the item from which embeddings are generated need not depict the item within any hand of any actor.

In some implementations, where multiple reference images are available for an item, embeddings or other representations of each of the reference images may be generated, and an embedding representing a mean or a centroid may be calculated for that item based on the embeddings or other representations generated from the reference images. An embedding generated for the item at box 370, which may itself represent a mean or a centroid of multiple embeddings, may be compared to the means or centroids calculated for the embeddings generated from the reference images of items.

In some implementations, based on the comparisons of the embeddings, a score or another output representing a level of relevance or confidence of each of the reference images to the cropped visual images may be calculated. Alternatively, reference images may be scored or ranked with respect to the cropped visual images in any manner.

At box 385, an item is selected from the confusion set. For example, in some implementations, embeddings representing the cropped visual images may be clustered, grouped or otherwise combined and compared to embeddings (or clusters or groups of embeddings) representing the reference images of items in the confusion set. An embedding, or a cluster or a group of embeddings of an item of the confusion set that is nearest or most similar to an embedding, or a cluster or a group of embeddings representing the cropped visual images may be identified, and the item associated with that embedding, cluster or group may be selected.

At box 390, an indication of an event by the actor involving the item selected from the confusion set at box 385 is stored in one or more data stores. For example, a record of items for the actor may be updated to indicate that the actor has retrieved the selected item or deposited the selected item at the location of the event identified at box 330, based on the type of event identified at box 330, and at a time during the duration of the event identified at box 330.

At box 395, whether the continued monitoring of the facility for interactions by actors is desired. If the continued monitoring of the facility for interactions is no longer desired, then the process ends. If the continued monitoring of the facility for interactions by actors is desired, however, then the process returns to box 310, where updated locating data regarding positions and identities of actors within the materials handling facility is identified and to box 315, where the camera within the facility captures additional visual images.

In accordance with implementations of the present disclosure, visual images captured at a materials handling facility may be processed in any manner to determine whether such images depict an event, to identify a type, a duration or a location of the event, to detect hands from the event, and to filter cropped images of the hands at any rate and at any frequency. For example, the visual images may be processed in a streaming manner or continuously, or in one or more batch processes, and using one or more processor units provided aboard cameras or in any other location and by any other system. Moreover, images captured using multiple cameras may be processed in a similar manner.

In some implementations, the cropped visual images may be processed at a rate that is less than a frame rate of the camera. For example, in some implementations, where a camera has a frame rate of fifteen frames per second (or 15 fps, or 15 Hz), cropped visual images may be generated and filtered at a rate of one per second (or 1 Hz), or one-fifteenth of the frame rate.

Furthermore, in some implementations, cropped visual images may be filtered in any number of iterations, e.g., based on a type of an event, to exclude images not associated with the event based on each of a duration of the event, a location of the event, a number of items within hands or a distance of a hand from the location of the event. In some implementations, the cropped visual images may be filtered for fewer than all of such bases, e.g., based on a duration, or a location, or a number of items, or a distance from the location of the event.

Although some of the implementations disclosed herein reference the detection of events, or the association of events with one or more actors based on images captured using one or more cameras, the systems and methods of the present disclosure are not so limited. Furthermore, although some of the implementations disclosed herein reference detecting events in a commercial setting, e.g., within a materials handling facility such as a fulfillment center or a retail establishment, the systems and methods of the present disclosure are likewise not so limited. Rather, the systems and methods disclosed herein may be utilized to detect events of any type or kind. Additionally, although some of the implementations described herein or shown in the accompanying figures refer to the processing of visual imaging data that is in color, e.g., according to an RGB color model, the systems and methods disclosed herein are not so limited, and may be used to process any type of information or data that is provided in color according to any color model, or in black-and-white or grayscale.

Moreover, any of the systems or methods disclosed herein may be utilized as a primary technique or means, or as an exclusive technique or means, for detecting events, or associating the events with actors based on imaging data captured using one or more cameras or other imaging devices. Alternatively, any of the systems and methods disclosed herein may be utilized as a secondary technique or means, or as an alternate or backup technique or means, for detecting events, or associating the events with actors. For example, those of ordinary skill in the pertinent arts will recognize that any of the systems and methods disclosed herein may be utilized in connection with, or in support of, any other technique or means for detecting events, or associating events with actors.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow chart shown in FIGS. 3A and 3B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A materials handling facility comprising:
    a storage fixture, wherein the storage fixture comprises a first storage unit and a second storage unit;
    a first camera having a first field of view, wherein the first field of view includes at least a portion of the first storage unit and at least a portion of the second storage unit, and wherein the first camera comprises a first processor unit and a first optical sensor;
    a second camera having a second field of view, wherein the second field of view includes at least the portion of the first storage unit and at least the portion of the second storage unit, and wherein the second camera comprises a second processor unit and a second optical sensor; and
    a computer system in communication with at least the first camera and the second camera,
    wherein the computer system is programmed with one or more sets of instructions that, when executed by the computer system, cause the computer system to perform a method comprising:
        determining positions of a plurality of actors within the materials handling facility over a period of time;
        receiving a first plurality of images, wherein each of the first plurality of images was captured by the first camera during the period of time;
        receiving a second plurality of images, wherein each of the second plurality of images was captured by the second camera during the period of time;
        determining that a first actor of the plurality of actors performed an event associated with the first storage unit at a time, wherein the time is within the period of time;
        determining a classification of the event, wherein the classification is one of a taking event or a deposit event;
        selecting a first subset of the first plurality of images based at least in part on the classification and the time;
        selecting a second subset of the second plurality of images based at least in part on the classification and the time;
        determining first positions of a first hand of the first actor over at least a portion of the period of time;
        determining second positions of a second hand of the first actor over at least a portion of the period of time;

determining that a first minimum distance between one of the first positions and the first storage unit is less than a second minimum distance between one of the second positions and the first storage unit over the period of time;

in response to determining that the first minimum distance is less than the second minimum distance,
selecting a third subset of the first plurality of images, wherein each of the images of the third subset is one of the images of the first subset depicting the first hand; and
selecting a fourth subset of the second plurality of images, wherein each of the images of the fourth subset is one of the images of the second subset depicting the first hand;

determining, for each of the images of the third subset, a number of items depicted within the first hand;

determining, for each of the images of the fourth subset, a number of items depicted within the first hand;

selecting a fifth subset of the first plurality of images, wherein each of the images of the fifth subset is one of the images of the third subset depicting one item within the first hand;

selecting a sixth subset of the second plurality of images, wherein each of the images of the sixth subset is one of the images of the fourth subset depicting one item within the first hand;

generating at least a first embedding, wherein the first embedding is representative of at least one image of a third plurality of images, and wherein the third plurality of images comprises the images of the fifth subset and the images of the sixth subset;

determining comparisons of at least the first embedding to each of a plurality of embeddings, wherein each of the plurality of embeddings is representative of at least one image of one of a plurality of items in inventory;

selecting a first item based at least in part on a comparison of the first embedding to a second embedding of the plurality of embeddings, wherein the second embedding is representative of at least one image of the first item; and storing an indication that the first actor executed the event associated with the first item at the time in at least one data store.

2. The materials handling facility of claim 1, wherein each of the images of the first subset and each of the images of the second subset was captured after the time if the classification is a taking event, and
wherein each of the images of the first subset and each of the images of the second subset was captured prior to the time if the classification is a deposit event.

3. The materials handling facility of claim 1, wherein the method further comprises:
selecting a confusion set of items, wherein the confusion set of items comprises a subset of the plurality of items available at the materials handling facility that are associated with the storage fixture; and
generating the plurality of embeddings based at least in part on a fourth plurality of images, wherein each one of the fourth plurality of images depicts one of the items of the confusion set.

4. A method comprising:
capturing a first plurality of images by a first camera within a materials handling facility over a first period of time, wherein a first storage unit is within a first field of view of the first camera;
providing at least some of the first plurality of images as first inputs to a first machine learning model, wherein the first machine learning model is trained to determine whether an event occurred at a location depicted within an image;
receiving at least a first output from the first machine learning model in response to the first inputs;
determining, based at least in part on the first output, that a first event occurred in association with at least the first storage unit;
determining a classification of the first event;
determining at least one time associated with the first event, wherein the at least one time is within the first period of time;
selecting a first subset of images based at least in part on the classification of the first event and the at least one time, wherein each of the images of the first subset is at least a portion of one of the first plurality of images;
determining positions of a plurality of hands during at least the first period of time;
selecting a first hand of a first actor based at least in part on a first position of the first hand of the first actor at the at least one time, wherein the first hand is one of the plurality of hands and the first position of the first hand is one of the positions of the plurality of hands;
determining, for each of the first subset of images, whether a number of items depicted within the first hand is one of:
zero;
one; or
greater than one;
selecting a second subset of images based at least in part on the first position and the number of items depicted within the first hand for each of the first subset of images, wherein each of the images of the second subset is at least a portion of one of the images of the first subset, and wherein the number of items depicted within the first hand in each of the second subset of images is one;
detecting at least a first item within the first hand in at least one of the images of the second subset; and
in response to detecting at least the first item within the first hand,
associating at least the first event and the first item with the first actor.

5. The method of claim 4, further comprising:
detecting a plurality of body parts of the first actor within at least some of the first plurality of images, wherein the first hand of the first actor is one of the plurality of body parts; and
cropping portions of the at least some of the first plurality of images, wherein each of the portions of the at least some of the first plurality of images depicts at least the first hand of the first actor,
wherein each of the first subset of images is a cropped portion of one of the at least some of the first plurality of images depicting at least the first hand.

6. The method of claim 5, further comprising:
determining that the classification of the first event is a taking of at least one item from the first storage unit, wherein each of the first subset of images was captured after the at least one time.

7. The method of claim 5, further comprising:
determining that the classification of the first event is a return of at least one item to the first storage unit, wherein each of the first subset of images was captured prior to the at least one time.

8. The method of claim 5, wherein determining the first position of the first hand of the first actor at the at least one time comprises:
determining that the first position of the first hand is nearer to the first storage unit than a second position of a second hand of the first actor during a portion of the first period of time, wherein the first portion of the first period of time includes the at least one time, and
wherein each of the images of the second subset of images was captured during the portion of the first period of time, and
wherein each of the images of the second subset of images depicts the first hand and does not depict the second hand.

9. The method of claim 5, wherein determining the first position of the first hand of the first actor at the at least one time comprises:
determining that a first distance between the first position of the first hand and the first storage unit during a portion of the first period of time is less than a second distance between a second position of a second hand and the first storage unit during the portion of the first period of time, wherein the first portion of the first period of time includes the at least one time, and
wherein each of the images of the second subset of images depicts the first hand and does not depict the second hand.

10. The method of claim 4, further comprising:
providing each of the images of the second subset as second inputs to a second machine learning model, wherein the second machine learning model is trained to generate at least one vector representative of an image;
receiving a plurality of second outputs from the second machine learning model, wherein each of the second outputs comprises an embedding representing one of the images of the second subset generated in response to one of the second inputs;
determining comparisons of at least one of a first plurality of embeddings to each of a second plurality of embeddings, wherein each of the first plurality of embeddings is included in one of the plurality of second outputs and represents one of the images of the second subset, and wherein each of the second plurality of embeddings is a representation of a reference image; and
identifying the first item based at least in part on a comparison of the at least one of the first plurality of embeddings to one of the second plurality of embeddings,
wherein the one of the second plurality of embeddings is a representation of an image of the first item.

11. The method of claim 10, further comprising:
identifying a plurality of reference images; and
generating the second plurality of embeddings based at least in part on the plurality of reference images,
wherein at least one of the plurality of reference images is an image of an item in inventory at the materials handling facility.

12. The method of claim 11, wherein at least one of the plurality of reference images is an image of an item not in inventory at the materials handling facility.

13. The method of claim 11, further comprising:
identifying a plurality of items associated with the first storage unit, wherein each of the plurality of reference images is an image of one of the plurality of items associated with the first storage unit.

14. The method of claim 10, wherein determining the comparisons of the at least one of the first plurality of embeddings to each of the second plurality of embeddings comprises:
calculating a first plurality of scores, wherein each of the first plurality of scores represents a comparison of the at least one of the first plurality of embeddings to one of the second plurality of embeddings; and
determining each of a second plurality of scores exceeds a predetermined threshold, wherein each of the second plurality of scores is one of the first plurality of scores representing a comparison of the at least one of the first plurality of embeddings to one of a third plurality of embeddings, and wherein each of the third plurality of embeddings is one of the second plurality of embeddings,
wherein each of the third plurality of embeddings is a representation of a reference image of one of a plurality of items available in inventory at the materials handling facility, and
wherein the first item is one of the plurality of items.

15. The method of claim 10, wherein at least one of the second plurality of embeddings is a centroid of a third plurality of embeddings, and
wherein each of the third plurality of embeddings is representation of one reference image of the same item.

16. The method of claim 4, further comprising:
providing at least some of the first plurality of images as second inputs to a second machine learning model executed by the first camera;
generating, by the first camera, maps of a plurality of body parts of the first actor depicted within the at least some of the first plurality of images based at least in part on second outputs received from the second machine learning model; and
determining positions of at least some of the plurality of body parts in three-dimensional space during the first period of time based at least in part on the maps,
wherein the first position of the first hand of the first actor at the at least one time is one of the positions.

17. The method of claim 4, further comprising:
receiving, by the first camera, locating data associated with the first actor, wherein the locating data comprises:
an identifier of the first actor;
visual descriptors of pixels depicting at least a portion of the first actor; and
at least one position of the first actor during the first period of time,
wherein the first position of the first hand of the first actor at the at least one time is determined by the first camera based at least in part on the locating data.

18. The method of claim 4, wherein each of:
that the first event occurred in association with at least the first storage unit; and
the at least one time associated with the first event,
is determined by at least one processor unit operating on the first camera, and
wherein at least the first item is detected within the first hand in the at least one of the images of the second subset by the at least one computer system in communication with the first camera.

19. The method of claim 4, further comprising:
identifying a plurality of items available at the materials handling facility;

selecting a confusion set of items, wherein the confusion set of items comprises a subset of the plurality of items available at the materials handling facility that are associated with the first storage unit;

providing a second plurality of images as second inputs to a second machine learning model, wherein each one of the second plurality of images is a reference image of one of the items of the confusion set, and wherein the second machine learning model is trained to generate at least one vector representative of an image; and receiving second outputs from the second machine learning model in response to the second inputs, wherein each one of the second outputs is one of a first plurality of embeddings representing one reference image of one of the items of the confusion set, and wherein detecting at least the first item within the first hand in at least one of the images of the second subset comprises:

providing the second subset of images as third inputs to the second machine learning model;

receiving third outputs from the second machine learning model in response to the third inputs, wherein each one of the third outputs is one of a second plurality of embeddings representing one image of the second subset of images, and determining comparisons of each one of the first plurality of embeddings to each one of the second plurality of embeddings, wherein the first item is detected based at least in part on a comparison of a first embedding of the first plurality of embeddings representing a reference image of the first item to a second embedding of the second plurality of embeddings representing one of the second subset of the images.

* * * * *